United States Patent
Fisher et al.

(10) Patent No.: US 9,584,182 B2
(45) Date of Patent: *Feb. 28, 2017

(54) VECTORED DSL CROSSTALK CANCELLATION

(71) Applicant: IKANOS COMMUNICATIONS, INC., Fremont, CA (US)

(72) Inventors: Kevin D. Fisher, Palo Alto, CA (US); Nicholas P. Sands, Sausalito, CA (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,168

(22) Filed: Oct. 7, 2014

(65) Prior Publication Data

US 2015/0023494 A1    Jan. 22, 2015

Related U.S. Application Data

(63) Continuation of application No. 12/997,222, filed as application No. PCT/US2009/046801 on Jun. 9, 2009, now Pat. No. 8,854,941.

(Continued)

(51) Int. Cl.
*H04J 1/12* (2006.01)
*H04B 3/32* (2006.01)
(Continued)

(52) U.S. Cl.
CPC ............... *H04B 3/32* (2013.01); *H04M 3/304* (2013.01); *H04M 3/34* (2013.01); *H04M 11/062* (2013.01); *H04M 3/2209* (2013.01)

(58) Field of Classification Search
CPC ............. H04B 3/464; H04B 3/32; H04B 3/20; H04B 2203/5408; H04L 25/03343; H04L 25/0272; H04L 25/0278; H04L 27/2601; H04L 45/02; H04L 45/22; H04L 45/24; H04L 45/26; H04L 45/28; H04L 43/0811; H04L 43/0829; H04L 43/12; H04L 43/0852; H04L 43/087; H04L 12/26; H04L 12/2859; H04L 12/2874; H04L 12/2898; H04L 12/6418; H04M 3/34; H04M 3/304; H04M 3/2209; H04M 11/062

(Continued)

(56) References Cited

U.S. PATENT DOCUMENTS 5,132,988 A    7/1992  Fisher et al.
5,430,661 A    7/1995  Fisher et al.
(Continued)

FOREIGN PATENT DOCUMENTS

EP    1914905 A1    4/2008
JP    2003-174386    6/2003
(Continued)

OTHER PUBLICATIONS

Ginis et al., "Vectored Transmission of Digital Subscriber Line Systems", IEEE JSAC, vol. 20, No. 5, Jun. 2002, pp. 1085-1104.

(Continued)

*Primary Examiner* — Andrew Chriss
*Assistant Examiner* — Rasha Fayed
(74) *Attorney, Agent, or Firm* — Holland & Hart LLP

(57) ABSTRACT

A vector DSL system includes a plurality of modems, which may be multi-port devices. Unprocessed user data is extracted from the modems and passed through a private vectoring data routing apparatus to one or more vectoring modules, such as vectoring cards. Each vectoring module includes one or more vector processors that include processing units configured to process the unprocessed user data on the basis of all modems' data for a given DSL tone grouping. Processing of the unprocessed user data removes the effects (Continued)

of FEXT from upstream and downstream user data and returns the processed user data to the modems using the vectoring data routing apparatus, which can be a specialized data transmission network utilizing one or more vector routers.

20 Claims, 21 Drawing Sheets

Related U.S. Application Data

(60) Provisional application No. 61/116,034, filed on Nov. 19, 2008, provisional application No. 61/060,415, filed on Jun. 10, 2008.

(51) Int. Cl.
*H04M 3/30* (2006.01)
*H04M 3/34* (2006.01)
*H04M 11/06* (2006.01)
*H04M 3/22* (2006.01)

(58) Field of Classification Search
USPC .................. 370/201, 227, 389, 420, 493
See application file for complete search history.

(56) References Cited

U.S. PATENT DOCUMENTS

| | | | |
|---|---|---|---|
| 5,479,447 A | 12/1995 | Chow et al. | |
| 6,314,146 B1 | 11/2001 | Tellado et al. | |
| 6,424,681 B1 | 7/2002 | Tellado | |
| 6,512,797 B1 | 1/2003 | Tellado et al. | |
| 6,829,307 B1 | 12/2004 | Hoo et al. | |
| 6,834,109 B1* | 12/2004 | Pare, Jr. .......... | H04B 3/32 375/254 |
| 6,965,657 B1 | 11/2005 | Rezvani et al. | |
| 6,990,196 B2 | 1/2006 | Zeng et al. | |
| 7,027,537 B1 | 4/2006 | Cheong et al. | |
| 7,158,563 B2 | 1/2007 | Ginis et al. | |
| 7,394,752 B2 | 7/2008 | Hasegawa et al. | |
| 8,767,521 B2* | 7/2014 | Singh .............. | H04M 3/304 370/201 |
| 2002/0136397 A1 | 9/2002 | Zeng et al. | |
| 2003/0086362 A1* | 5/2003 | Hasegawa ........ | H04B 3/32 370/201 |
| 2003/0086514 A1* | 5/2003 | Ginis .............. | H04L 7/0016 375/346 |
| 2005/0123027 A1 | 6/2005 | Cioffi et al. | |
| 2005/0123028 A1 | 6/2005 | Cioffi et al. | |
| 2005/0138524 A1 | 6/2005 | Cioffi | |
| 2005/0152385 A1* | 7/2005 | Cioffi .............. | H04B 3/32 370/420 |
| 2005/0259725 A1 | 11/2005 | Cioffi | |
| 2005/0271075 A1 | 12/2005 | Cioffi et al. | |
| 2006/0039454 A1 | 2/2006 | Cioffi | |
| 2006/0039486 A1 | 2/2006 | Rhee et al. | |
| 2006/0095565 A1 | 5/2006 | Rhee et al. | |
| 2006/0098725 A1 | 5/2006 | Rhee et al. | |
| 2006/0114977 A1 | 6/2006 | Ginis et al. | |
| 2006/0187820 A1* | 8/2006 | French ............ | H04L 29/12066 370/227 |
| 2006/0198430 A1 | 9/2006 | Rhee et al. | |
| 2006/0259535 A1 | 11/2006 | Cioffi et al. | |
| 2006/0268733 A1 | 11/2006 | Rhee et al. | |
| 2006/0268966 A1 | 11/2006 | Cioffi et al. | |
| 2006/0274825 A1 | 12/2006 | Cioffi et al. | |
| 2006/0274893 A1 | 12/2006 | Cioffi et al. | |
| 2006/0276918 A1 | 12/2006 | Cioffi et al. | |
| 2006/0280235 A1 | 12/2006 | Rhee et al. | |
| 2006/0280236 A1 | 12/2006 | Rhee et al. | |
| 2006/0280237 A1 | 12/2006 | Rhee et al. | |
| 2006/0280238 A1 | 12/2006 | Cioffi et al. | |
| 2007/0011559 A1 | 1/2007 | Cioffi et al. | |
| 2007/0036339 A1 | 2/2007 | Cioffi et al. | |
| 2007/0036340 A1 | 2/2007 | Rhee et al. | |
| 2007/0081582 A1* | 4/2007 | Ginis .............. | H04L 7/0016 375/222 |
| 2008/0068978 A1* | 3/2008 | Clausen ........... | H04L 25/03343 370/201 |
| 2008/0170609 A1* | 7/2008 | Heidari ............ | H04M 11/062 375/222 |
| 2008/0219290 A1 | 9/2008 | Cioffi et al. | |
| 2009/0034592 A1* | 2/2009 | Mirfakhraei ...... | H04B 3/32 375/222 |
| 2009/0207985 A1 | 8/2009 | Cioffi et al. | |
| 2009/0257581 A1* | 10/2009 | Biyani ............ | H04L 27/2647 379/417 |
| 2010/0034374 A1* | 2/2010 | Ohman ............ | H04B 3/32 379/406.06 |
| 2010/0135482 A1 | 6/2010 | Jagannathan et al. | |

FOREIGN PATENT DOCUMENTS

| | | |
|---|---|---|
| WO | 2007/146048 | 12/2007 |
| WO | WO-2008/045525 A2 | 4/2008 |

OTHER PUBLICATIONS

Ginis et al., "Vectored-DMT: A FEXT Canceling Modulation Scheme for Coordinating Users", Proc. of IEEE ICC 2001, vol. 1, Jun. 2001, pp. 305-309.

Mammoliti et al, "DSL Forum Vendor Specific RADIUS Attributes", RFC 4679, The Internet Society, Sep. 2006.

Ginis et al., "Vectored Transmission for Digital Subscriber Line Systems," IEEE Journal on Selected Areas in Communications, vol. 20, No. 5, Jun. 2002, pp. 1085-1104, Institute of Electrical and Electronics Engineers.

ISA/KR, International Search Report and Written Opinion of the International Searching Authority, Int'l. App. No. PCT/US2009/046801, Jan. 14, 2010, Korean Intellectual Patent Office, Seo-gu, Daejeon, KR, 16 pgs.

\* cited by examiner

Figure 16

| Sub-Field Names | Sub-Field Length (bits) | Parameter Description | Field Length (bits) | Field Name |
|---|---|---|---|---|
| Ports In Packet | 16 | 16-bit map of ports included in packet. LSB=port 0 | 16 | Ports in Packet |
| Superframe Index | 15 | this allows pilot sequence lengths up to 1024. Index resets to zero at start of Pilot Symbol Sequence. | 24 | Index |
| Symbol Index | 9 | 0:255=data frames, 256= sync frame, 257-511 undefined | | |
| Band StartBin Index | 16 | first tone of band | | Bin Range |
| Band StopBin Index | 16 | last tone of band | 32 | |
| Port 0 Data | 2*b | b=configured FFT/IFFT data precision, port 0 first | | |
| Port 1 Data | 2*b | | 2*N*b | StartBin Payload |
| ... | ... | | | |
| Port N-1 Data | 2*b | | | |
| Port 0 Data | 2*b | b=configured FFT/IFFT data precision | | |
| Port 1 Data | 2*b | | 2*N*b | StartBin+1 Payload |
| ... | ... | | | |
| Port N-1 Data | 2*b | ... | ... | ... |
| Port 0 Data | 2*b | b=configured FFT/IFFT data precision | | |
| Port 1 Data | 2*b | | 2*N*b | StopBin Payload |
| ... | ... | | | |
| Port N-1 Data | 2*b | | | |
| CRC | 16 | Not required if included in Serdes protocol. Can pad Payload to make entire payload 16 bit multiple. | 16 | CRC |

US 9,584,182 B2

VECTORED DSL CROSSTALK CANCELLATION

CROSS-REFERENCE TO RELATED APPLICATIONS

This application is a Continuation of U.S. patent application Ser. No. 12/997,222, filed Dec. 9, 2010, (Now U.S. Pat. No. 8,854,941), which is the National Stage of International Patent Application of PCT/US2009/046801, filed Jun. 9, 2009, which claims the benefit of U.S. Provisional Patent Application Ser. No. 61/116,034, filed Nov. 19, 2008, and U.S. Provisional Patent Application Ser. No. 61/060,415, filed Jun. 10, 2008, each of which is hereby incorporated by reference in its entirety.

FIELD OF THE INVENTION

The present invention relates generally to the field of vectored DSL communication systems.

BACKGROUND OF THE RELATED ART

Digital Subscriber Line (DSL) communications suffer from various forms of interference, including crosstalk. Various techniques have been developed to combat this interference and its deleterious effects on data transmission. Vectored DSL has been one such measure in development for some time. Systems, apparatus and/or other hardware implementations that provide improved vectored DSL performance and operation without creating data transmission and data processing bottlenecks in the vectoring of each DSL line would represent a significant advancement in the art.

BRIEF DESCRIPTION OF THE DRAWINGS

The present invention will be readily understood by the following detailed description in conjunction with the accompanying drawings, wherein like reference numerals designate like structural elements, and in which:

FIG. 16 is an example of a packet structure according to one or more embodiments of the present invention.

DETAILED DESCRIPTION OF THE PREFERRED EMBODIMENTS

Figure 1:
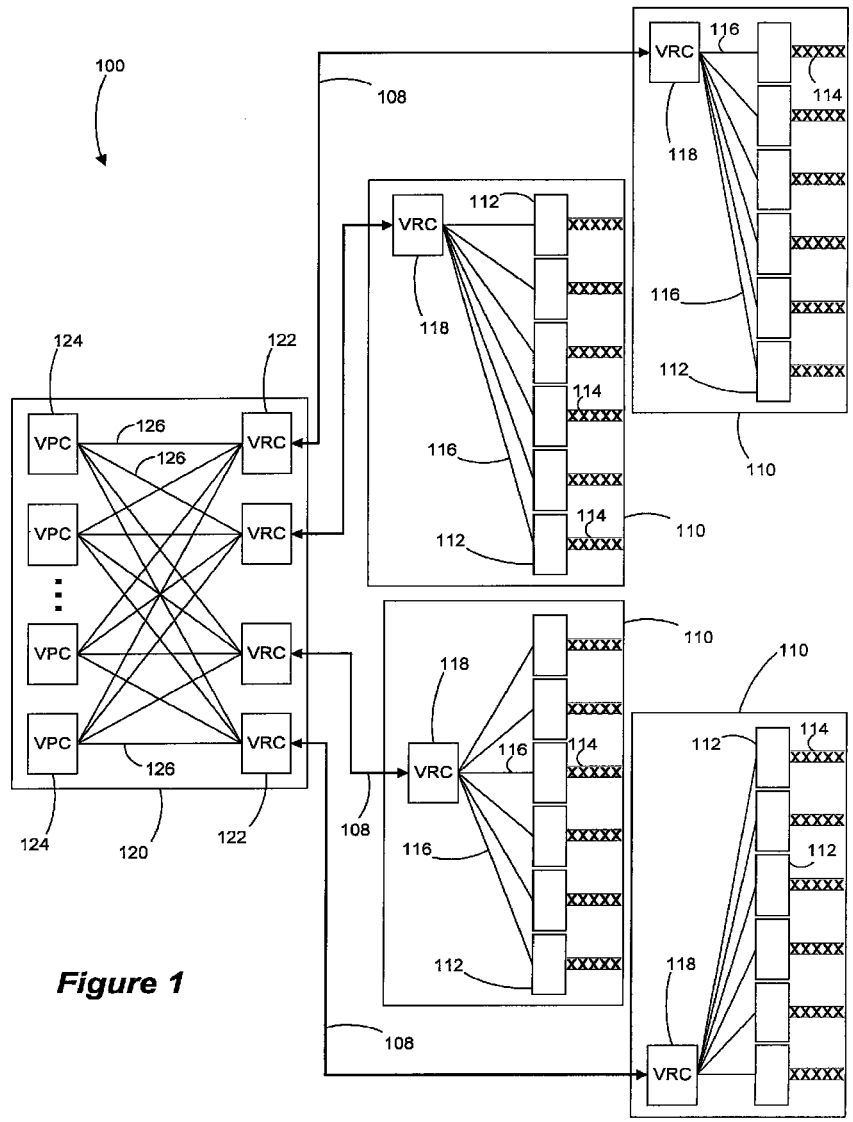
FIG. 1 is a block diagram of a vectored DSL system according to one or more embodiments of the present invention.

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. As one skilled in the art will appreciate, computer and other companies may refer to components by different names. This disclosure does not intend to distinguish between components that differ insubstantially. Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The term "chip" refers broadly to a hardware device that operates in a prescribed manner, for example to process data, and can include various types of such devices (for example, a field-programmable gate array (FPGA), a digital signal processing (DSP) chip, an application-specific integrated circuit (ASIC), an integrated circuit (IC), etc.). The term "system" refers broadly to a collection of two or more components and may be used to refer to an overall system (e.g., a computer and/or communication system or a network comprising one or more computers, communication components, etc.), a subsystem provided as part of a larger system (e.g., a subsystem within an individual computer), and/or a process or method pertaining to operation of such a system or subsystem. In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein.

Reference in the specification to "some embodiments," "one embodiment," "an embodiment," etc. of the present invention means that a particular feature, structure or characteristic described in connection with such embodiment(s) is included in at least one embodiment of the present invention. Thus, the appearances of the noted phrases in various places throughout the specification are not necessarily all referring to the same embodiment.

In the absence of crosstalk, the existing copper telephone infrastructure can in theory be utilized to carry from tens to hundreds of megabits per second over distances up to approximately 5000 feet using discrete multitone (DMT) digital subscriber line (DSL) modem technology. DMT modems divide the available bandwidth into many sub-carriers that are synchronized and independently modulated with digital QAM data to form an aggregate communication channel between the network and subscriber. DMT-based DSL systems typically use Frequency Division Multiplexing (FDM) and assign particular sub-carriers to either downstream (that is, from network/CO to subscriber/user) or upstream (from subscriber/user to network/CO) directions. This FDM strategy limits near end crosstalk (NEXT). DMT systems are typically very robust in the presence of radio frequency interference (RFI) and other types of frequency-selective noise (or interference) or channel dispersion, because each sub-carrier can be independently modulated with an appropriate amount of data and power in order to meet the system requirements and the desired bit error rate.

Typical telephone binder cables typically contain between 10 and 50 unshielded copper twisted pairs (these binders are then bundled into larger cables). Due to variations in manufacturing and imperfect cable installation (for example, bending, etc.), significant levels of far-end crosstalk (FEXT) occur between each twisted pair within a binder (and between adjacent binders). More specific discussions concerning FEXT can be found in the various patent applications filed by Adaptive Spectrum and Signal Alignment of Redwood City, Calif. and Stanford University.

As a result of typical cable construction, installation and deployment techniques, each twisted pair is physically adjacent to many other twisted pairs in (or outside) its binder for a significant distance in the cable. While there is variation in the FEXT levels as a result of manufacturing variation, the net result is that every copper pair imparts some amount of FEXT onto virtually every other copper pair in the cable. In many instances, the FEXT can be as much as or more than 40 dB higher than the background noise level on the line and the crosstalk typically increases with frequency. Cable measurements have shown that each particular line has at least, and often more than, 5 to 10 disturbers that impact the line's performance. As a result, FEXT is the dominant impairment in reaching high data rates in DMT DSL systems on relatively short loops (for example, below 4,000 feet).

An advanced signal processing technique called "vectoring" can cancel FEXT between twisted pairs within copper telephone cables and permit dramatically higher data rates. Vectoring is well known to those skilled in the art, and is explained in more detail in "Vectored Transmission for Digital Subscriber Line Systems," by G. Ginis and J. Cioffi (IEEE JSAC special issue on twisted-pair transmission, Vol. 20, Issue 5, pp. 1085-1104, June 2002); and "Vectored-DMT: A FEXT Canceling Modulation Scheme for Coordinating Users," by G. Ginis and J. Cioffi (Proceedings of IEEE ICC 2001, Vol. 1, Helsinki, Finland, pp. 305-09, June 2001), both of which are incorporated by reference herein for all purposes.

The basic principle behind vectoring is coordinating communications between every twisted pair in a telephone cable. Because all twisted pairs in the cable terminate in one central location known as a DSLAM (DSL access multiplexer), the DSLAM is the natural location to coordinate this communication. To vector the modems effectively in the vectoring systems, the modems must be synchronized to the same DMT symbol clock and must have synchronized training/tracking periods with pre-arranged training data patterns (unique to each modem) to allow victim modems to identify the crosstalk channel characteristics between particular disturber-victim modem pairs. As will be appreciated by those skilled in the art, there are a variety of techniques for identifying crosstalk in such systems, including one or more that may be described in various applicable standards pertaining to DSL systems and their implementation.

Using the "crosstalk topography" or mapping determined during training and the like (which typically is viewed or considered as a matrix representing the various interactive/crosstalking relationships between DSL lines), transmit pre-compensation (for example, precoding) can be used in the downstream direction (from DSLAM to customer site). In effect, the transmit waveform for a given modem is pre-distorted based on the transmit waveforms being used by many other modems (that is, the other modems whose FEXT materially affect the given modem's signals), such that the interfering FEXT is effectively balanced and its effects thus eliminated by the time the pre-distorted modem signal reaches its customer side terminus. In the upstream direction (from customer site to DSLAM), MIMO (multiple-input-multiple-output) spatial filtering is used at the DSLAM to cancel upstream FEXT at the upstream receive side. Identification and tracking of the FEXT filter cancellation coefficients may be performed using the LMS (Least Mean Squares) adaptive algorithm or other Least-Squares type methods, as is well known to those skilled in the art. Training signals to support identification of the FEXT filter coefficients may be integrated into a modified version of a known DSL standard, such as VDSL2.

A typical telephone cable or grouping of multiple cables terminating in one telco "central office," "CO," "node," "cabinet," etc. may contain anywhere from 50 to 2,000 (or more) twisted pairs, potentially spread among a dozen or more binder cables. As a result of telco deployment practices, modems assigned to twisted pairs in the same binder cable may not be connected to the same line card or DSLAM chassis. This occurs because telcos add line cards to a chassis (or add one or more additional chassis) as customers subscribe to DSL service. Modem ports are assigned on a "first-come-first-served" basis, rather than being grouped together based on user identity, downstream terminus location, etc. Even if the telco practices were different, it would be an operational (and error-prone) challenge to segregate phone lines according to binder of origin (a practice known as binder group management). Empirical cable measurements have shown that significant FEXT coupling can come from adjacent binders or even different cables that terminate in the same telco node due to the use of a "cross box" or patch panel in the telco node. These patch panels are used to map individual copper pairs (possibly from different binders or telco cables) to specific modem ports on the DSLAM line cards.

Another related issue is the practice of bonding multiple modem ports together. Bonding can increase the customer data rate in situations where a single modem port cannot provide the desired data rate. A customer who has started with a single modem port can have a second port added as an upgrade to provide additional services to the customer (the multiple-port DSL service thus has the potential to carry more data, operate at faster speeds, etc.). Many current systems require bonded modem ports to be connected to the same line card. This is impractical for most telcos for the same reasons that binder group management is impractical, as discussed above.

Finally, the computational demands of DSL vectoring—especially the real-time processing of crosstalk information in connection with user data signals—create data transmission and processing bottlenecks and other problems. The large volume of data that needs to be processed quickly (to reduce latency/delays) must be transmitted and processed efficiently. Embodiments of the present invention provide systems, apparatus and methods that provide such efficient handling and processing of these large amounts of data while having little negative effect on the latency and/or performance of the DSL lines being vectored.

To implement vectoring, each modem in a chassis must exchange real-time FEXT information with the other modems in the chassis (or even multiple chassis units). Typical DSL modems use a DMT symbol rate in the range of 4 kHz to 8 kHz, and FEXT cancellation must be done over the vectored bandwidth once per DMT symbol with a processing delay on the order of a few DMT symbols (or less) to avoid degrading the overall latency of the end-to-end modem system. This creates a complex and challenging data networking environment in which each line card shares real-time FEXT information from each of its modems with each of the other modems in the system (which might include modems on another line card or chassis in the system). In a typical DSLAM system, the communication flow of vectoring information can total tens of gigabits per second. Current generation DSLAM copper backplanes generally cannot handle this additional communication load, and future DSLAM copper backplanes need a practical method for managing this communication flow with reasonable complexity and operational performance.

Embodiments of the present invention include apparatus, systems, methods, etc. that eliminate or substantially reduce the communication bottlenecks that otherwise would confront vectored DSL systems. These embodiments are scalable, from small port-count systems (for example, a single line card system) up to much larger systems, with thousands of modem ports spread across multiple line cards and/or multiple chassis. Embodiments of the present invention work with both optical interconnect technologies (in the case of multiple chassis systems or line card upgrades to legacy chassis equipment) and also work with future copper interconnect technologies in which all communications flow within a single DSLAM on a copper backplane or using high bandwidth copper interconnect. Embodiments of the present invention also permit "virtual bonding" that allows telcos to virtually bond modem ports across multiple line cards and/or multiple chassis.

FIG. 1 illustrates a vectoring data communication system 100 in which line cards 110 contain DSL modems 112 (for example, multi-port devices) that control communications on twisted-pair lines 114. Multiple line cards 110 are connected via a high speed communication apparatus, such as XAUI lines 108 or the like in FIG. 1, to a vectoring control entity (VCE) that can be or include a centralized vectoring module 120 (which can be, for example, a vectoring card). XAUI is the standard for extending the XGMII (10 Gigabit Media Independent Interface) between the MAC and PHY layer of 10 Gigabit Ethernet (10 GbE) and such high speed data communication lines 116 can be used to connect modems 112 to line card vector router components (VRC-Ls) 118. The VRC-Ls 118 form an abstraction layer for the modem 112, as the modem 112 needs to connect to only one VRC-L 118 and the complexity of the specific vectoring deployment (for example, number of ports, line cards, etc.) is thus hidden from each modem 112.

The vectoring data flow from each modem 112 to its respective VRC-L 118 includes frequency domain samples for downstream and upstream communications—that is, IFFT-input transmit (TX) data for downstream vectoring and/or FFT-output receive (RX) data for upstream vectoring. The data returned to each modem 112 from the vectoring module 120 via a VRC-L 118 is the modem's crosstalk-adjusted (that is, vectored) IFFT-input and/or FFT-output data that is conditioned and/or processed to prevent and/or remove crosstalk interference from other vectoring system modems. The VRC-L 118 in each line card 110 acts as an interface between that line card's modems 112 and the vectoring module 120. High-speed communication lines 108 (for example, 10-40 Gbps or higher optical or copper interconnect) network a VRC-L 118 on each line card 110 to a companion VRC-V 122 on the vectoring module 120. 10-40 Gbps is a common data communication requirement that can be implemented between the vectoring module 120 and each line card 110. Today this would mostly likely be an aggregation of 5 Gbps or 10 Gbps XAUI lines or similar, whether over the electrical backplane or the optical cable.

The VRC-Vs 122 on vectoring module 120 subdivide the modem vectoring data stream into sub-bands for subsequent crosstalk cancellation in one or more vector processors (VPCs) 124, as defined by system requirements. The vector processors may also be referred to as "vector processor components," "computational devices" and/or the like. That is, data is removed from a normal (that is, non-vectored) data stream in each modem and is reorganized into data bundles defined by frequency characteristics so that the data can be crosstalk-processed on a frequency basis (for example, tone-by-tone, groups of tones, etc.). Once processed, the data is then again reorganized from the frequency-based bundles used for crosstalk-removal processing and is reassembled for transmission/use by the modems.

For example, upstream and downstream bands can be vector routed by one or more VRCs (for example, a VRC-L/VRC-V pair) to individual VPCs. A vector router is a specialized data networking device or subsystem that implements a specialized "private" data network, which can be similar to an Ethernet network, for the purpose of efficiently moving vectoring data between modems and vector processors to avoid processing or data transmission bottlenecks. Packets of vectoring data can contain headers and/or other state information enabling efficient routing of the vectoring data over the data network without the need for dedicated links between each modem and vector processor device. To this end, a vector router also converts vector data packets from a format readily supplied by the modems into a format that is naturally utilized by the vector processors, then converting back again after vectoring has been performed (for example, interleaving and de-interleaving of the modem vectoring data stream). This task may be split between VRC-Ls and VRC-Vs, or performed in only one or the other, depending on the configuration. Alternately, VPC assignment can be based on evenly spaced sub-bands (independent of upstream and downstream band allocation). Data transmission between VRC-Vs 122 and VPCs 124 on the vectoring module 120 can be performed using high speed interconnect lines 126 (for example, XAUI or the like).

The exemplary packet structure illustrated in FIG. 16 allows for real-time vectoring of data between a number of DSLAM-side modems (for example, VTU-Os) and a vectoring control entity (VCE). Request packets containing payload data in the form of unprocessed user data (that is, user data for which crosstalk effects have not been compensate—also referred to as "uncorrected" data or signals herein) for vectoring are sent to a vector processor or the like, where vectoring processing compensates for crosstalk effects in the unprocessed user data DSL signals. The processed DSL data is then repacked as payload data and sent in reply packets back to the respective modems that supplied the unprocessed user data (request and reply packets typically use similar configurations). A packet is constructed (for example, by the VRC-L) with non-vectored data sent from every modem, and this packet is sent for vectoring processing once per symbol for each tone and modem/port range. Essentially, non-vectored data sent to a VPC gets unpacked, vectoring processed, re-packed in reply packets that are similar to the non-vectored data packets, and subsequently transmitted back to modems in reply packets, which return vectored data in the same format as the non-vectored data that was transmitted by the modems. The packing and unpacking of data by a VRC-L or the like follows the line card and/or modem port map so that vectored data is returned to the modem/port from which its corresponding non-vectored data was extracted (that is, request packets and reply packets can be identified by their modem or modem port of origin).

Other types of packets can be used in connection with embodiments of the present invention. For example, along with the vector data packets described, vector error packets, vector configuration packets and vector control packets can be sent throughout the vectoring data network to configure, adjust, etc. the vectored DSL system as appropriate (for example, to configure, control or synchronize modems chips or to configure, control or synchronize vector processors). Any of the packets described herein can include one or more modem port identifiers, a modem chip identifier, a line card identifier, a chassis identifier, or information identifying at least one DMT tone range so that tracking and addressing of the packets is achieved.

For vector request packets, the payload data can include inverse fast Fourier transform samples for a plurality of modem ports and tone sets identified in the request packet header, fast Fourier transform samples for a plurality of modem ports and tone sets identified in the request packet header, downstream frequency domain data for a plurality of modem ports and tone sets identified in the request packet header, and/or upstream frequency domain data for a plurality of modem ports and tone sets identified in the request packet header. Additional fields and components of the packet can be utilized (for example, a cyclic redundancy check or CRC). A vector error packet can include upstream training error samples for the modem ports and tone sets identified in the request packet header, upstream tracking error samples for the modem ports and tone sets identified in the request packet header, upstream DMT sync symbols for the modem ports and tone sets identified in the request packet header, downstream training error samples for the modem ports and tone sets identified in the request packet header, downstream tracking error samples for the modem ports and tone sets identified in the request packet header, and/or downstream DMT sync symbols for the modem ports and tone sets identified in the request packet header.

The embodiment of FIG. 16 shows the vectoring data packet format defined for modems serving N ports and vectoring data transmitted to/from the modems over the DSL vectoring data network (also referred to as the "private network," "routing subsystem," "vector routing network," "special network" or the like) has this format. The VRC-L adds a header on such a packet to identify the modem chip and line card, so the source of the data is known as the packet flows to the VRC-V (or, if no VRC-V is on the vectoring card, then to whatever destination is used in the vectoring card) and then on to the VPC/VPU. As vector-processed data comes back from the vectoring card to the VRC-L (or, if no VRC-L is used, then to the modems from which the vectoring data was extracted and transmitted), this header is removed before distributing the packets back to the appropriate modem chips. The VRC-L and/or VRC-V may optionally re-assemble packets from multiple modem chips into a format for use by the VPCs, depending on how the modems provide the data. Use of such packets and headers (coupled with vector router use in some embodiments) allows the vectored DSL system to scale to larger (or smaller) numbers of ports, and no hardwired/dedicated data bus is required between each modem and vector processor. Appropriate error signal packets and configuration and control messages also can flow over the network accordingly.

The VRC pairing configuration 118, 122 effectively converts data consideration from a per-port modem basis to a per-band (or per-frequency-set) VPC basis, at least for crosstalk cancellation pre-processing. Because crosstalk cancellation is most effectively and easily performed in the frequency domain on a per-tone, per-band or per-tone-set basis, this conversion greatly reduces the complexity of the vectoring system's implementation. Matching sub-bands (that is, groupings of the same one or more frequencies, referred to as "tone groupings," "tone sets," "sub-bands" and the like) from every modem 112 in the vectoring system 100 are collected and aggregated to enable crosstalk cancellation inside a VPC 124 between each victim modem and any set or subset of disturber modems.

As will be appreciated by those skilled in the art, the sub-bands assigned to each VPC 124 do not have to consist of contiguous frequencies in the system. For example, if there are 6 VPCs 124 in vectoring module 120, each consecutive VPC 124 may take the next frequency or frequency bin, meaning that the "first" VPC 124 will get frequencies 1, 7, 13, 19, etc. and the "fourth" VPC 124 will get frequencies 4, 10, 16, etc. Alternately, each VPC 124 can be sent a tone set, for example groups of 8 tones each, so that the first VPC 124 gets tones 0-7, the second VPC 124 gets tones 8-15, etc. Such distributions of data can provide a more "even" usage of available resources, for example preventing "clogging" of one or more given communication lines 126 due to a data dump from the relevant VRCs 122 to a single VPC 124 while the remaining VPCs 124 and lines 126 are idle.

The data on the private vectoring data network of system 100 consists of special purpose packets identifying the source modem 112 and destination VPC 124. Alternatively, the source and destination address can be implied by the packet timing. Each packet consists of IFFT input (and/or FFT output) data for one sub-band to/from one modem 112. Because DMT-based DSL systems operate using a DMT symbol period (for example, 4 kHz or 8 kHz), data communications from the modems 112 to the VPCs 124 and back again are repeated for every DMT symbol, possibly using pipelining of the communication and computation to use available networking bandwidth and computational resources more efficiently. Per-tone training/tracking error signals, diagnostic data to/from the modems 112 and other configuration and/or management data can use the same networking communication path and packet structure.

Various hardware devices and/or components can be used to implement embodiments of the present invention. Various current FPGAs and the like are suitable for constructing configurations according to embodiments illustrated herein. For example, Altera Stratix IV GX FPGA devices (e.g., EP4SGX70, EP4SGX110, EP4SGX230, etc.) are appropriate for such implementations. In some embodiments of the present invention, each VPC 124 is a separate chip (FPGA, ASIC, etc.) on which are programmed multiple VPUs as defined below. Other hardware configurations will be apparent to those skilled in the art.

Figure 2:
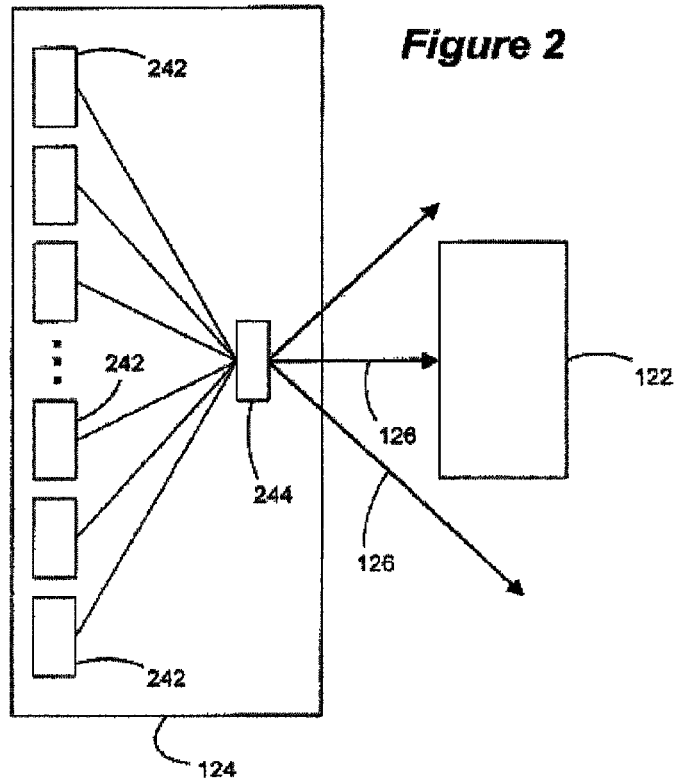
FIG. 2 is a block diagram of a portion of a vectored DSL system according to one or more embodiments of the present invention.

As illustrated in FIG. 2, each VPC 124 contains or implements one or more dedicated vector processing units 242 (VPUs), each of which performs vectoring for a subset of the modems and/or disturbers. Allocation and/or sharing of the VPU resources may be advantageous in some cases and can be accomplished in various ways. For example, each VPC 124 can contain a centralized set of VPUs 242 that are time-shared among all of the modems 112 for vectoring within a given sub-band. Alternately, each VPC 124 can contain a distributed set of VPUs 242 in which each VPU 242 is dedicated to a particular modem 112 within the sub-band assigned to the VPC 124. Multiple VPUs 242 can coordinate communication between their host VPC 124 and one or more VRC-Vs 122 using a VPU dispatcher 244 or the like.

A VPU 242 processes all of the IFFT/FFT data for a tone set (for example, a single tone, a group of tones, a band or sub-band of tones, etc.) for all of the modems making up the vectored DSL system. The VPU 242 processes this data once per DMT symbol, in a somewhat periodic manner. As noted above, in some embodiments, each VPC 124 is a collection of one or more VPUs 242, where each VPU 242 independently processes its batches of tones without any explicit communication with other VPUs 242. In a simple exemplary setting, a system might use 4096 tones, 2 VPUs, and N modems. Each VPU 242 handles tones in batches of 16 tones. Tones can be assigned to VPUs as follows:

VPU0: tones 0-15, 32-47, . . .
VPU1: tones 16-31, 48-63, . . .

In this example, the modems provide their FFT/IFFT data to the VRC-based private network in tone order from 0 to 4095. When the FFT/IFFT data gets routed to the VPCs, the VRC distributes data like "dealing cards" to the two VPUs in batches of 16 tones. This keeps the data networking pathway and VPUs uniformly busy without bottlenecks. For each tone, the VPU performs the equivalent of an N×N matrix multiply to perform vectoring (or maybe less than a full N×N multiply if the vectoring matrix is "sparse").

Each VPU has a pre-determined processing capability level (for example, number of complex multiplications per second), based on the logic design and chip technology utilized. Additionally, the required level of processing power "per tone" for the vectoring system will increase as the number of modems, N, increases. Thus, the required number of VPUs is a function of the number of modems in the system and the number of vectored tones over the DMT bandwidth. Therefore, systems with a large number of vectored tones and/or a large number of modems will consequently need a larger number of VPU resources (and consequently VPC chips) to perform vectoring. That is, as the number of modems increases in a vectored system, the number of tones that each VPU can process will decrease due to the additional modems' data that need to be processed. As will be appreciated by those skilled in the art, the size of each sub-band can be determined by cost and complexity limits for a given implementation, as well as the DSL band profiles that are supported by the design. For example, in an implementation for a system having a 17 MHz VDSL profile, 384 modems, and vectoring up to 64 disturbers per modem, a practical system would have on the order of 128 VPUs with each VPU processing 32 tones per DMT symbol. As the VPU logic is reconfigured to reflect any changing dimensions of the system (number of modems, number of vectored tones, etc.), vector routing is adjusted accordingly.

Figure 3:
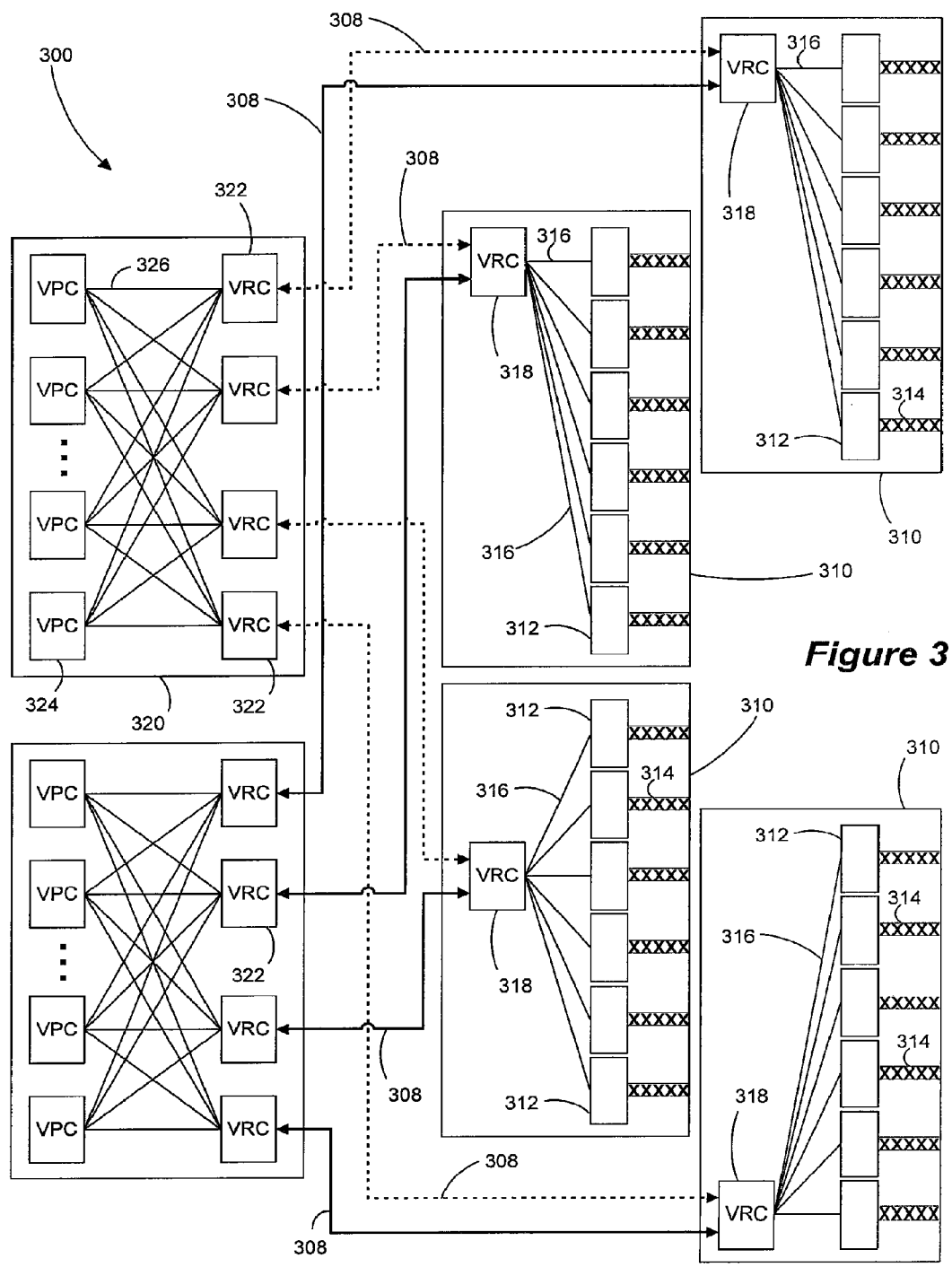
FIG. 3 is a block diagram of a vectored DSL system according to one or more embodiments of the present invention.

In embodiments of the present invention such as the one shown in FIG. 3, the vectoring system 300 may exceed the practical complexity for a single card used as the vectoring module 120 (for example, power consumption, card area, etc.). The system illustrated in FIG. 3 permits splitting or allocating vectoring processing of system 300 onto multiple vectoring cards 320 (in a chassis, in a module or in multiple modules) where each card 320 performs crosstalk cancellation over some fraction of the total DSL frequency band. With this configuration, vectoring can be performed in systems with hundreds or even thousands of simultaneously operating modems. VPCs typically do not need to communicate with each other explicitly, although they will be roughly synchronized implicitly by the flow of the FFT/IFFT data and training signals coming from the modems.

Figure 4:
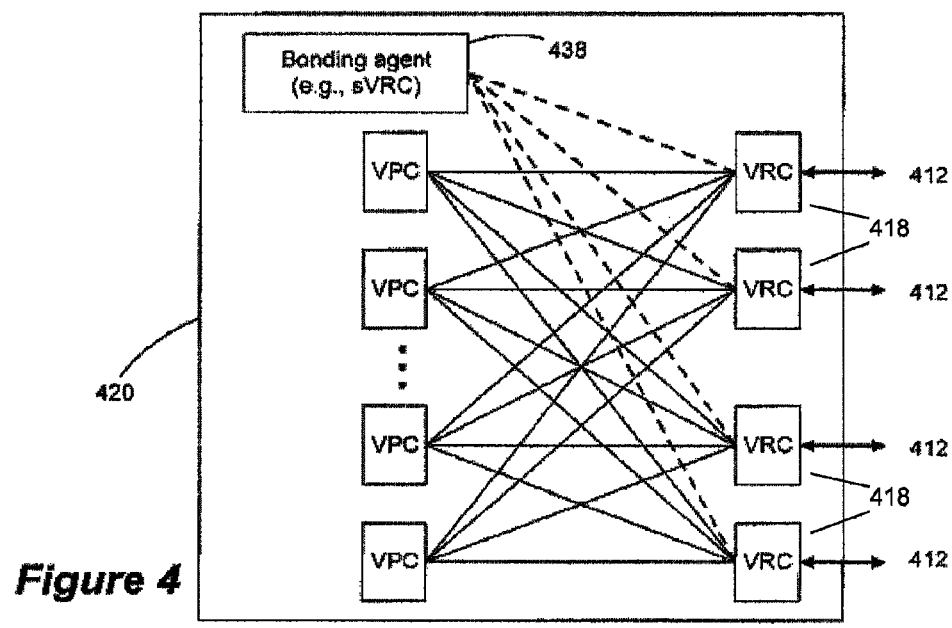
FIG. 4 is a block diagram of a vectoring module or vectoring card according to one or more embodiments of the present invention.

In the embodiment of the present invention illustrated in FIG. 4, the vectoring data transmission path from each modem 412 to a vectoring card 420 can be further utilized to serve a dual function and perform "virtual bonding." In addition to passing crosstalk cancellation data, each modem 412 in the bonded modem group (that is, two or more modems serving a user in a bonded fashion) can pass customer data streams (for example, IP packets) along this same communication path. One or more bonding routers 438 (acting as a supplemental VRC (sVRC), bonding agent and/or controller) on vectoring card 420 connect via VRC-Vs 418 to each VRC on its respective line-card. Each bonding router 438 performs routing between VRC-Vs and, thus, their respective VRC-Ls. This effectively creates a data path between and/or among any two or more modems in the vectoring system and multiple modem ports can then be bonded in the vectoring system, provided that one of the two modems performs the aggregation function and presents the total bonded data stream to the uplink path of the DSLAM, as will be appreciated by those skilled in the art.

Figure 5:
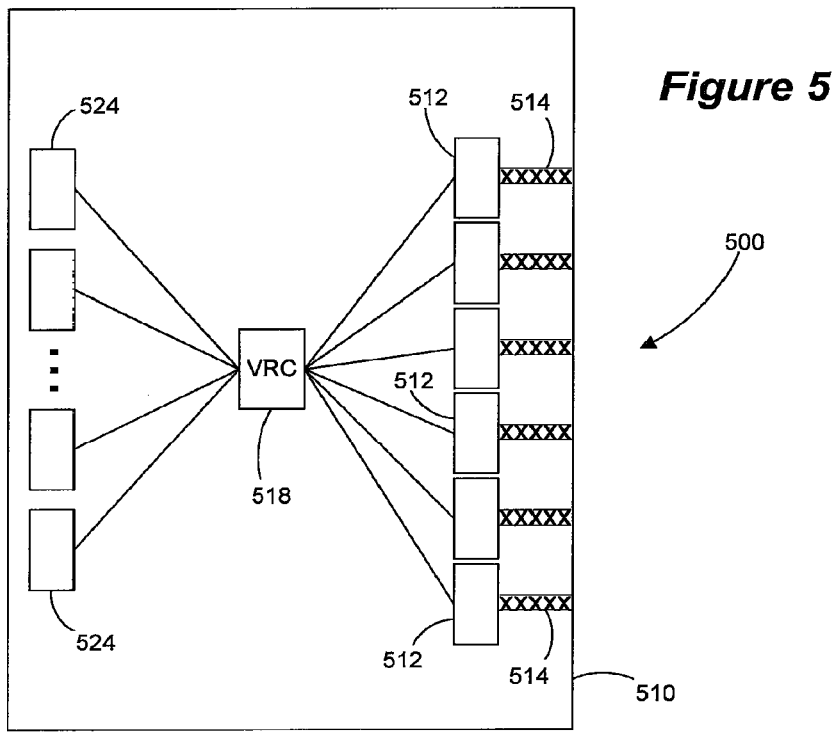
FIG. 5 is a block diagram of a vectored DSL system according to one or more embodiments of the present invention.
Figure 10A:
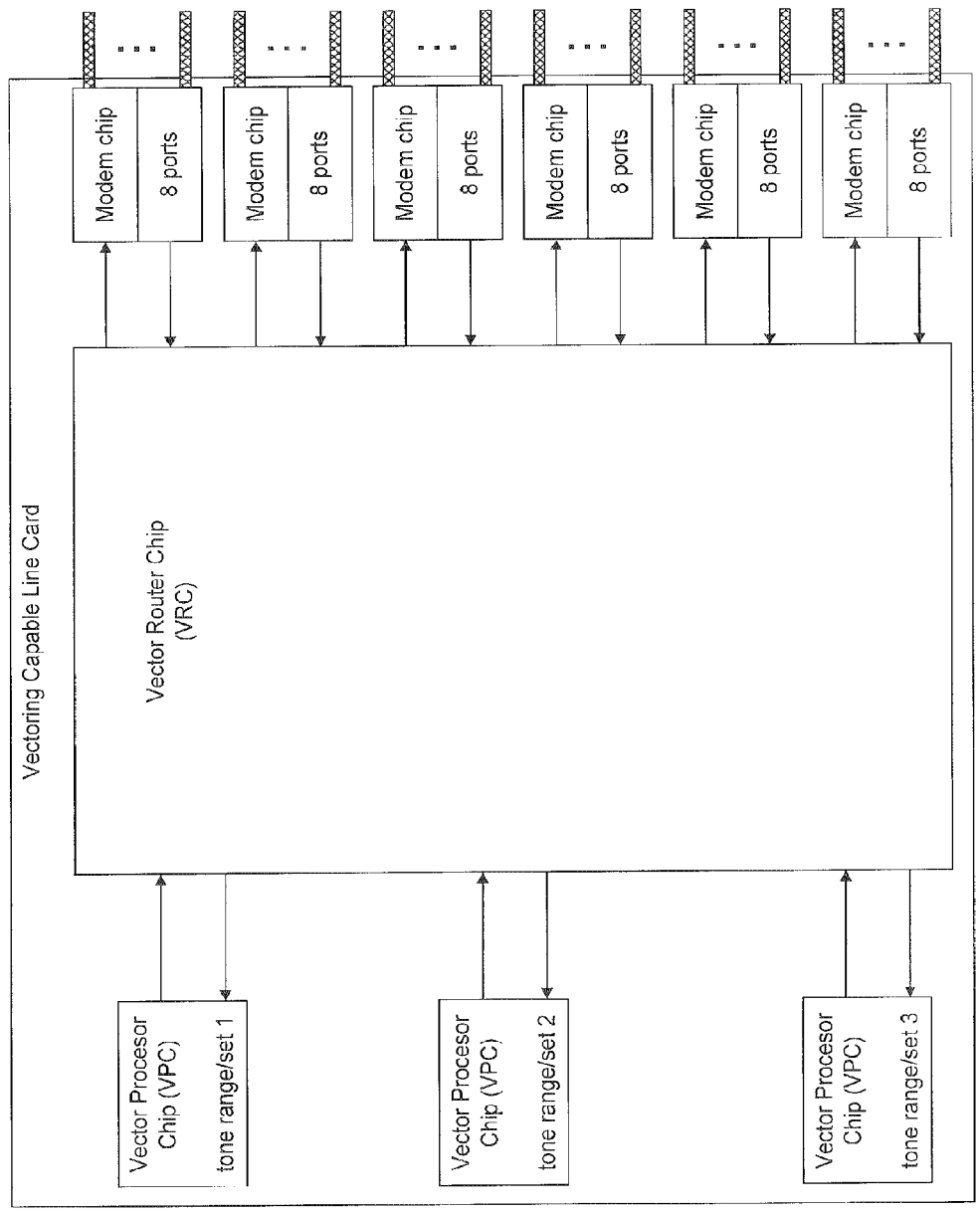
FIGS. 10A-10E are various block diagrams of vectoring data network configurations according to one or more embodiments of the present invention.

In yet another embodiment of the present invention illustrated in FIG. 5, a simplified system 500 fits onto a single line-card 510 (see also FIG. 10A). Once again, VRC resources 518 (a single VRC, for example, or alternately two VRCs back-to-back) provide routing between modem ports and the VPCs 524 that provide processing of designated sub-bands.

Figure 6:
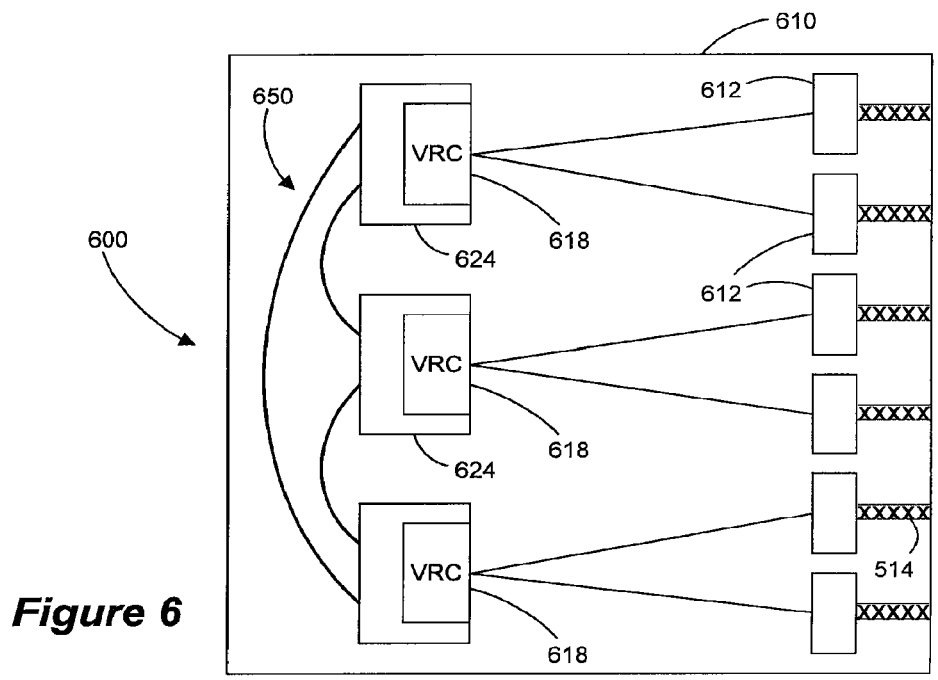
FIG. 6 is a block diagram of a vectored DSL system according to one or more embodiments of the present invention.

In low port-count systems with only modest networking communication bandwidth, the VRC functionality 618 can be situated directly inside each VPC 624, as illustrated in the embodiment shown as system 600 in FIG. 6. For example, where an FPGA is used as the VPC 624, a portion of the FPGA configuration is dedicated to the routing functionality. In this case, the cost savings realized by removing an independent vector routing device from the system outweigh the additional communication requirements. FIG. 6 shows both daisy chain and mesh network connection options 650 between VPCs 624. In practice, one or the other would be utilized (not both) based on the communication requirements and tradeoffs for the system.

Figure 7:
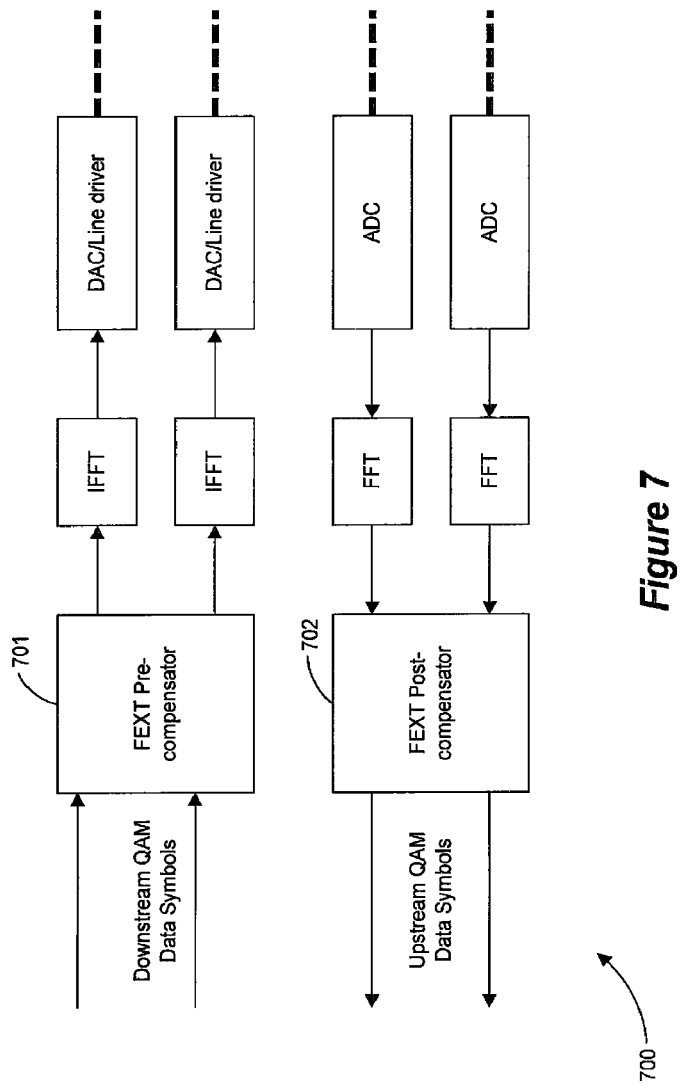
FIG. 7 is a block diagram of a DSL data processing stream in which embodiments of the present invention can be implemented.

FIG. 7 illustrates general operation of the vectoring operation 700, wherein efficient implementation of the downstream FEXT pre-compensator 701 and upstream FEXT post-compensator 702 can be accomplished using one or more embodiments of the present invention. In the downstream direction, a plurality of QAM data symbols from a plurality of modems is FEXT pre-compensated by coordinating or "vectoring" communication among all modems on a per-tone basis, followed by subsequent IFFT and digital-to-analog conversion operations on a per-modem basis to transmit the FEXT-compensated signal onto the Telco copper pair. In the upstream direction, a plurality of received FFT samples is FEXT post-compensated by coordinating or "vectoring" communication among all modems on a per-tone basis, followed by subsequent decoding of the QAM data symbols on a per-modem basis.

Figure 8:
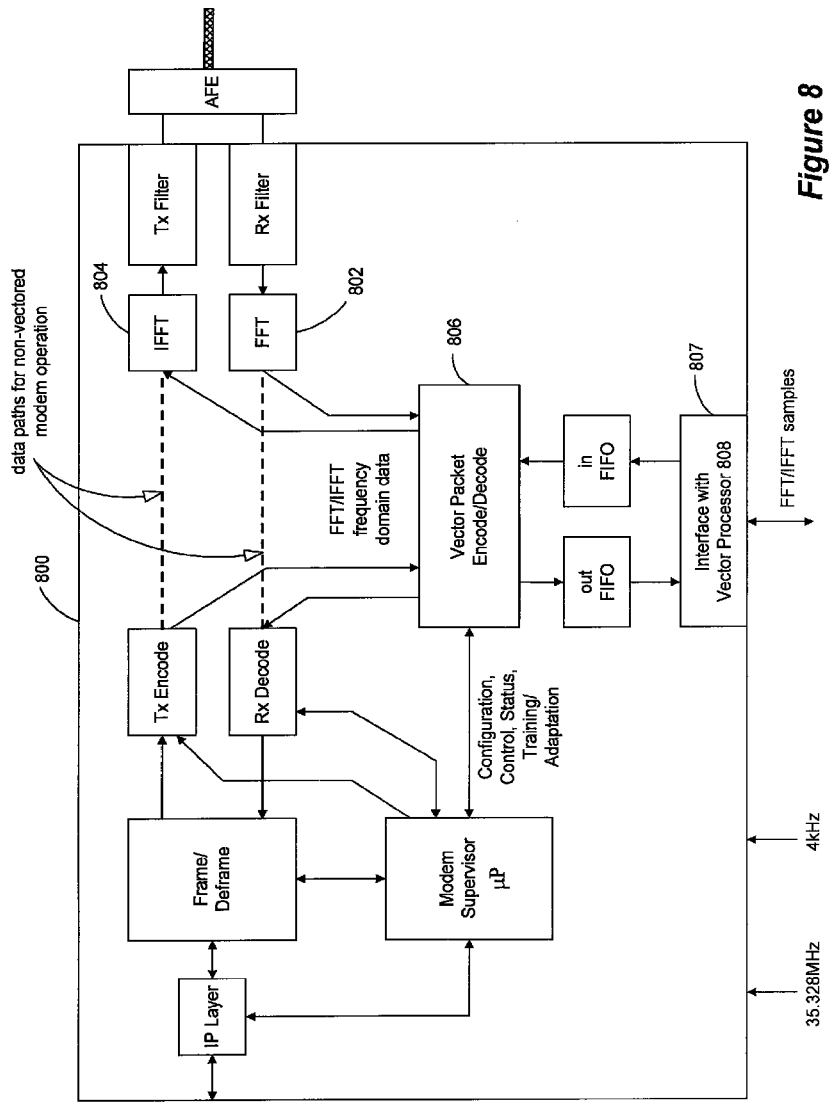
FIG. 8 is a block diagram of a DSLAM modem in which embodiments of the present invention can be implemented.

FIG. 8 shows a generic modem port for a commonly available DSLAM side VDSL modem device 800 that has been modified to support vectored communication using one or more embodiments of the present invention. The upstream FFT 802 outputs and the downstream IFFT 804 inputs are intercepted by a vector packet encoder/decoder 806 (or "vectoring data extractor") and sent to a vector processor 808 via interface 807 to allow vectoring of the data stream among all modems in the vectoring group. By removing, processing and "reinserting" data from the data stream, such a vector processor system may introduce a small number of symbols of latency in the modem's receive and transmit data paths.

Figure 9A:
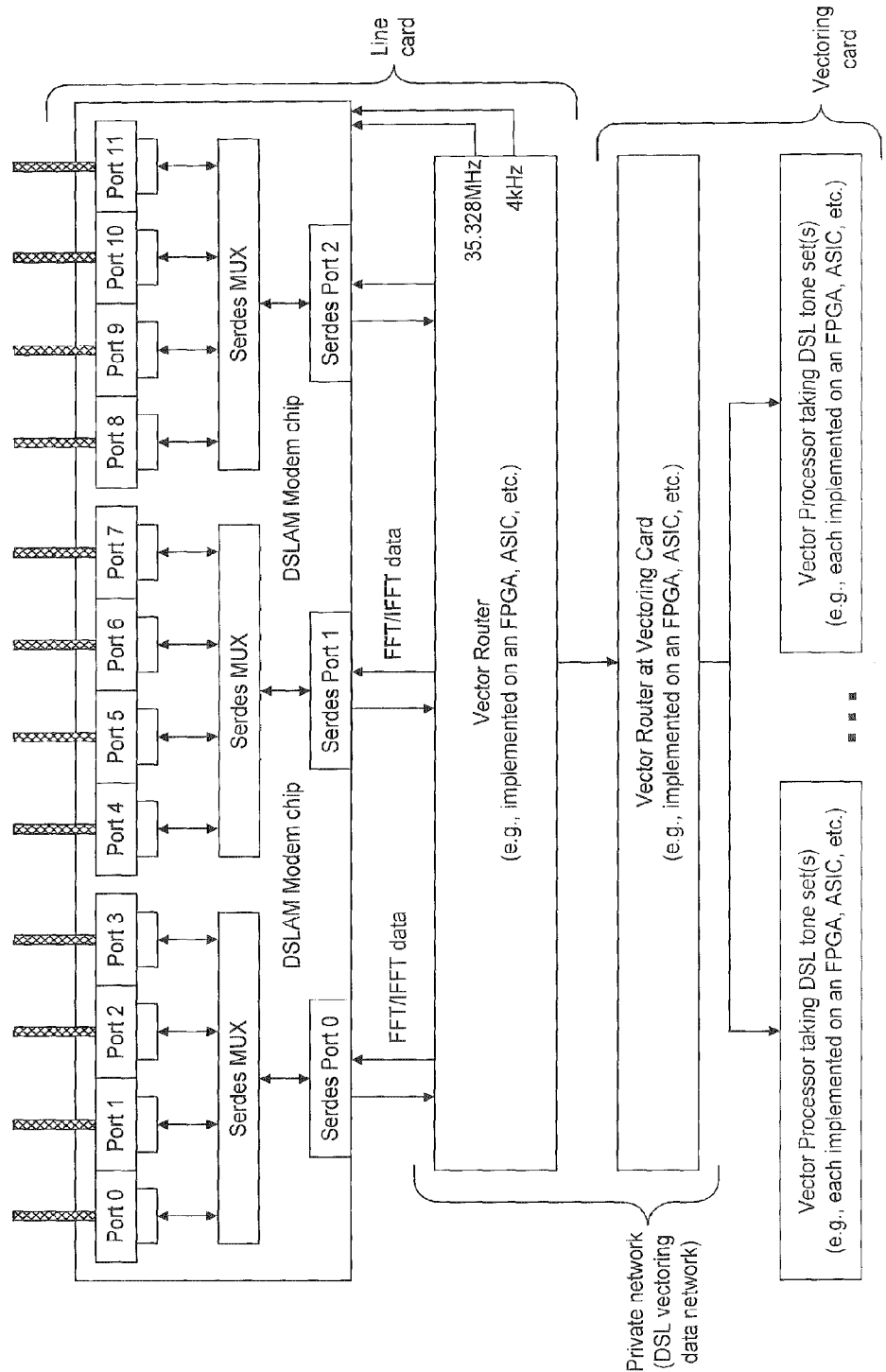
FIGS. 9A-9D are block diagrams of DSLAM modem chip interfaces with a vectored DSL system according to one or more embodiments of the present invention.
Figure 9B:
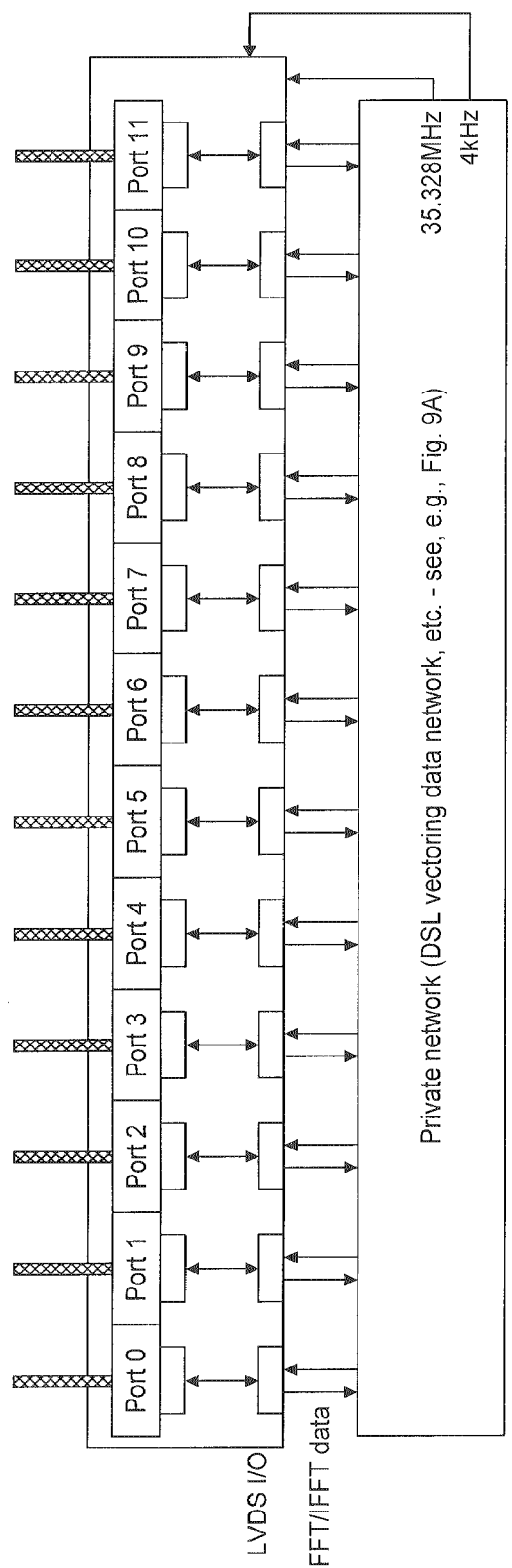
Figure 9C:
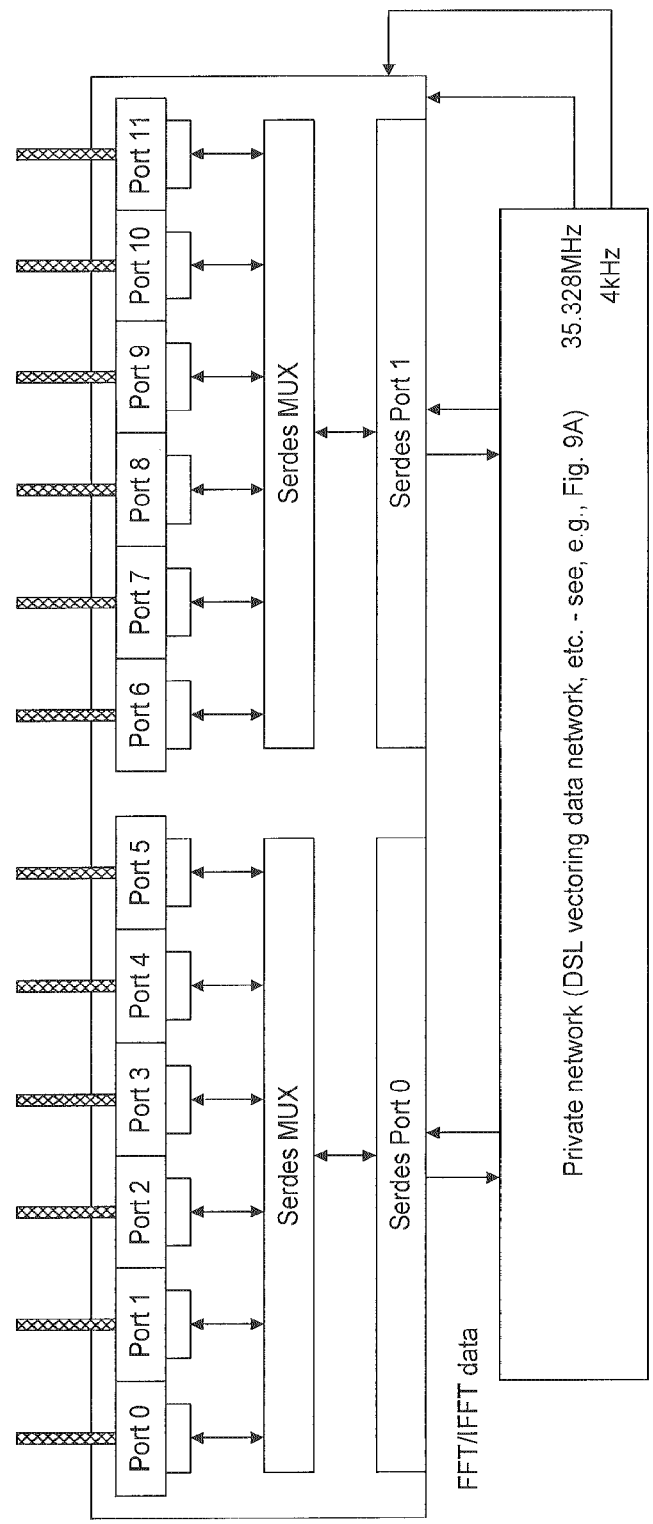
Figure 9D:
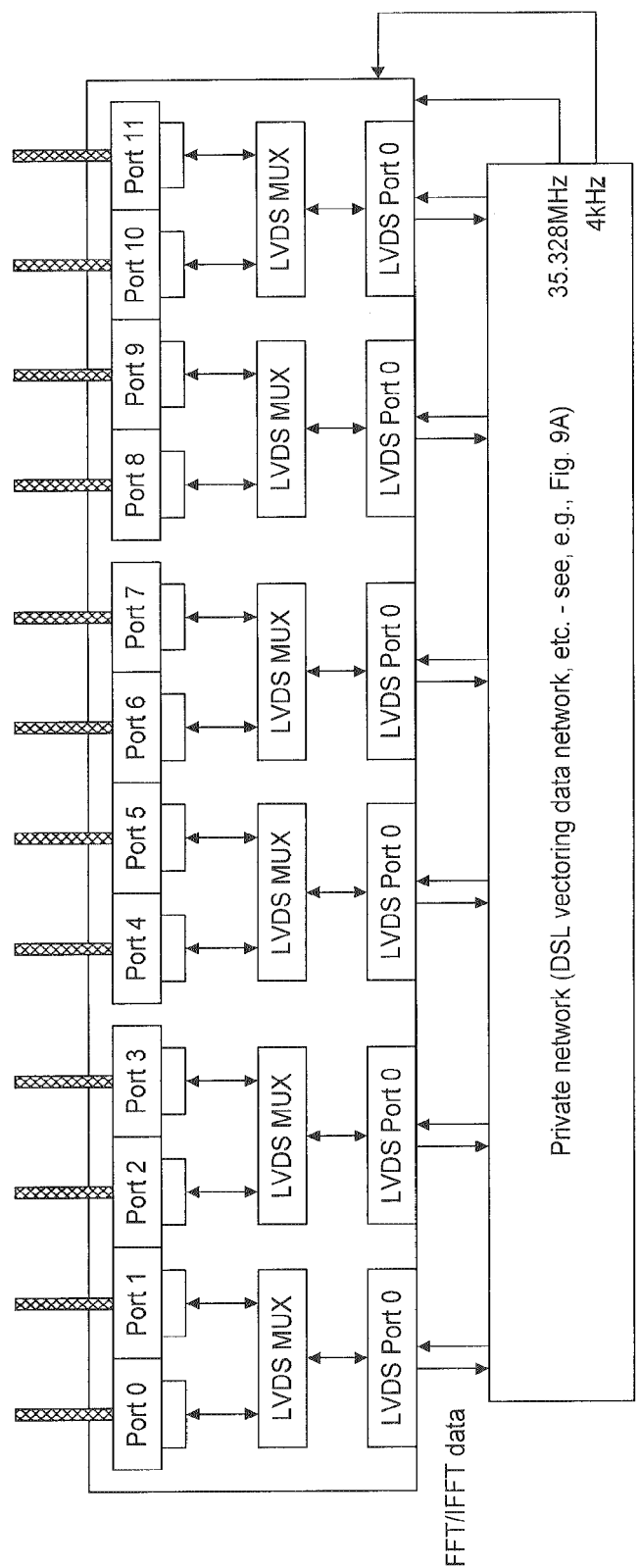

FIGS. 9A-9D provide several specific embodiments of a DSLAM side modem configuration for communicating with a vector processor chip, specifically showing possible interfaces between a modem chip and a VRC. FIG. 9A shows the configuration of a 12-port, ITU 993.2 Profile 30a profile vectored VDSL DSLAM side modem chip that supports vectoring (for example, a 5G serializer/deserializaer or "Serdes" type). In order to efficiently make use of I/O pins on the multi-port modem chip and reduce power consumption, a high-speed serial interface such as XAUI or the like can be used to aggregate FFT/IFFT data from each modem device over a single data networking link either directly to a vector processor chip or to a vector router chip for subsequent forwarding to a vector processor. FIG. 9B illustrates a 12-port, ITU 993.2 Profile 30a profile vectored VDSL DSLAM side modem chip that supports vectoring. In this embodiment, low voltage differential signaling (LVDS) interface circuits (1 LVDS per modem port) are used. FIG. 9C illustrates a 12-port, ITU 993.2 Profile 17a vectored VDSL DSLAM side modem chip that supports vectoring (for example, a 5G Serdes type). FIG. 9D illustrates a 12-port, ITU 993.2 Profile 17a vectored VDSL DSLAM side modem chip that supports vectoring (for example, a LVDS type, with 1 LVDS interface per 2 modem ports).

Figure 10B:
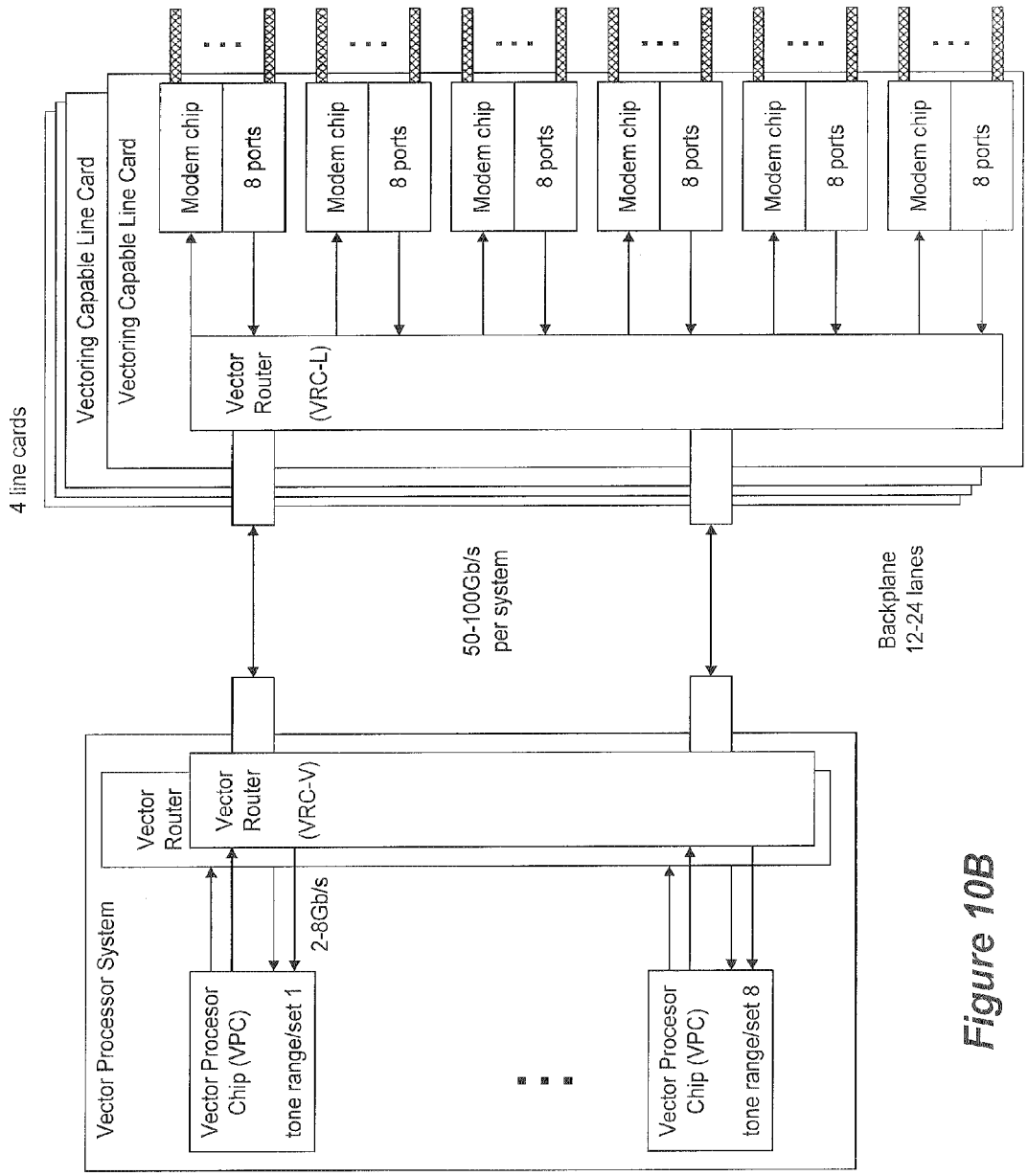
Figure 10C:
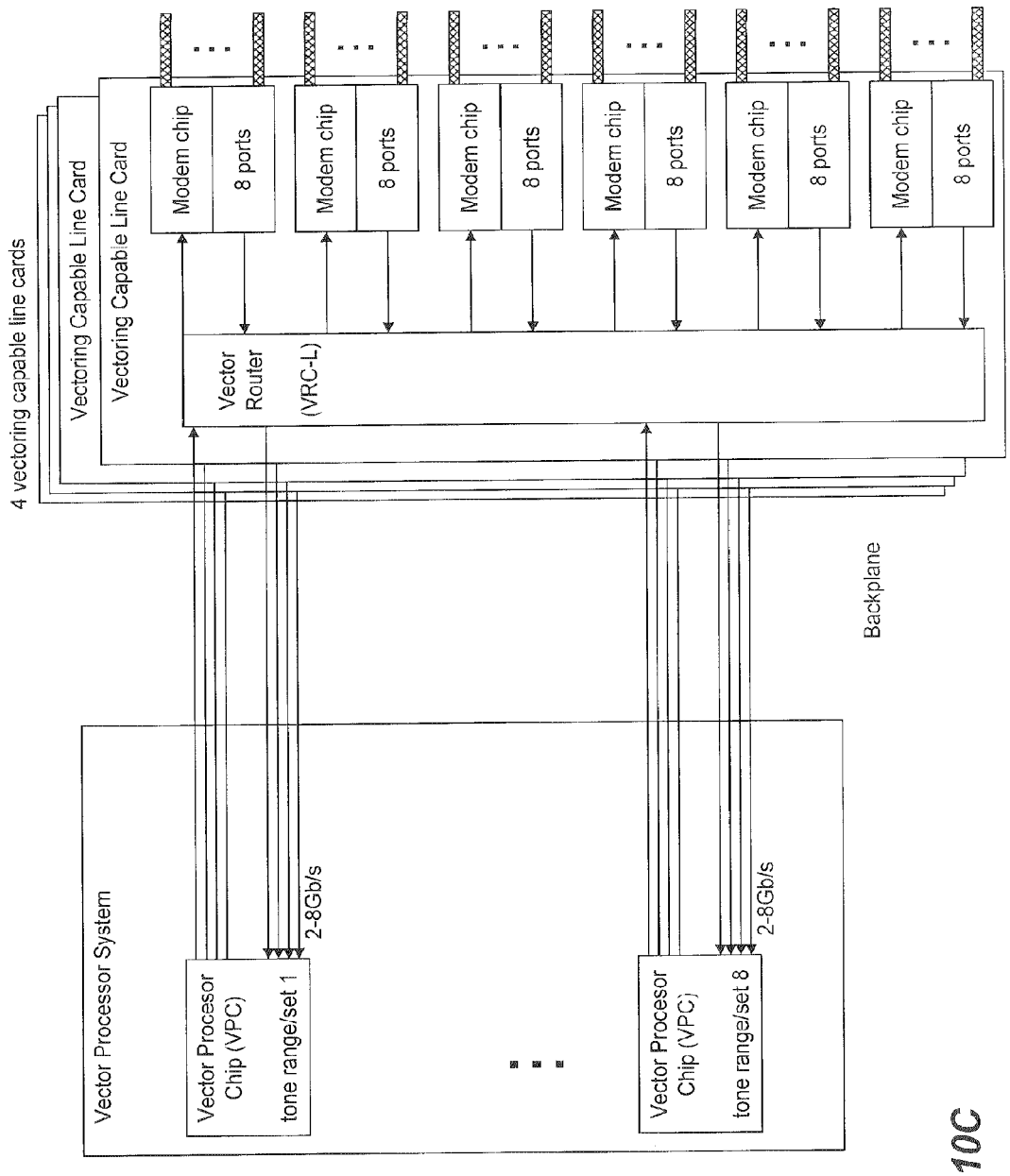
Figure 10D:
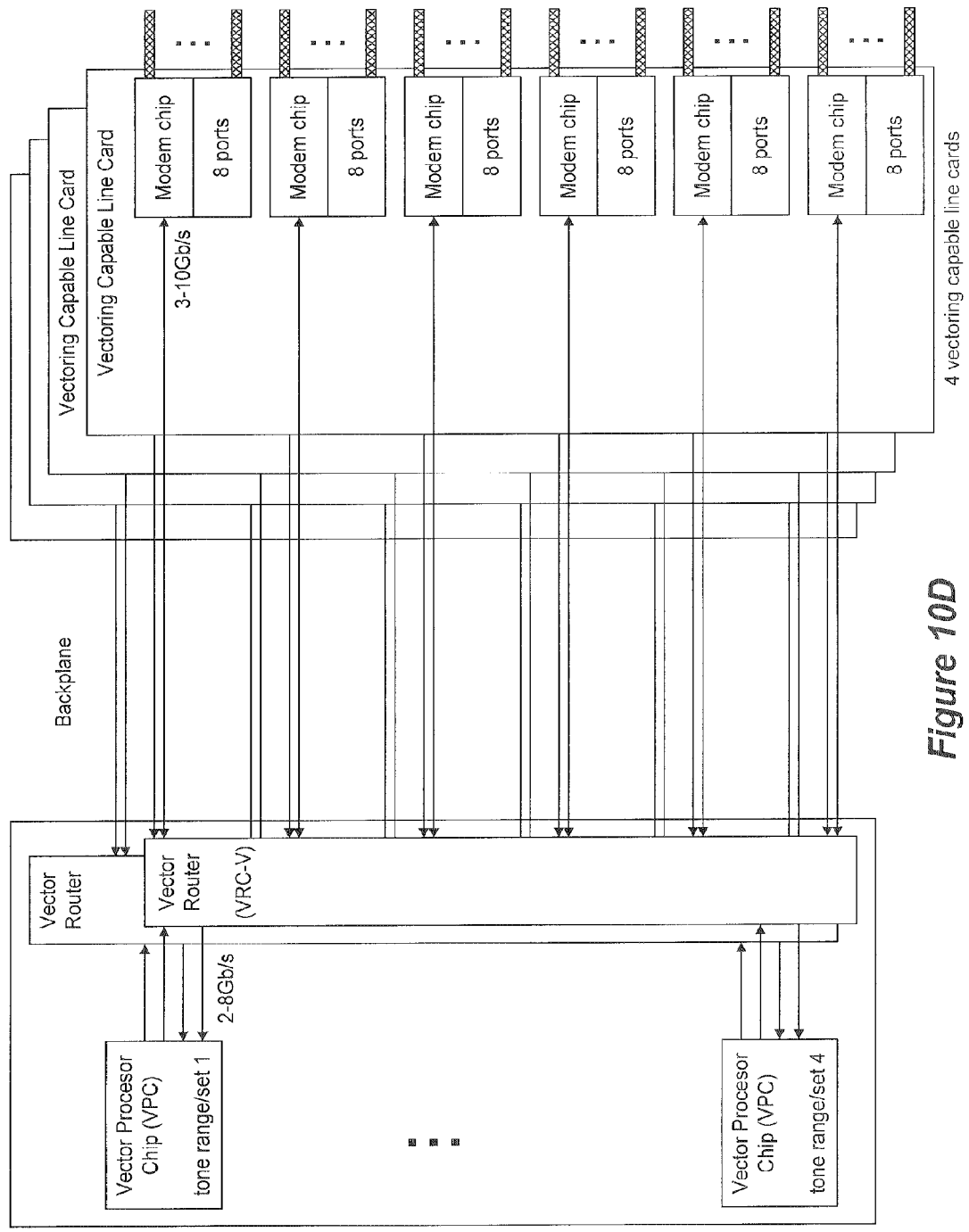
Figure 10E:
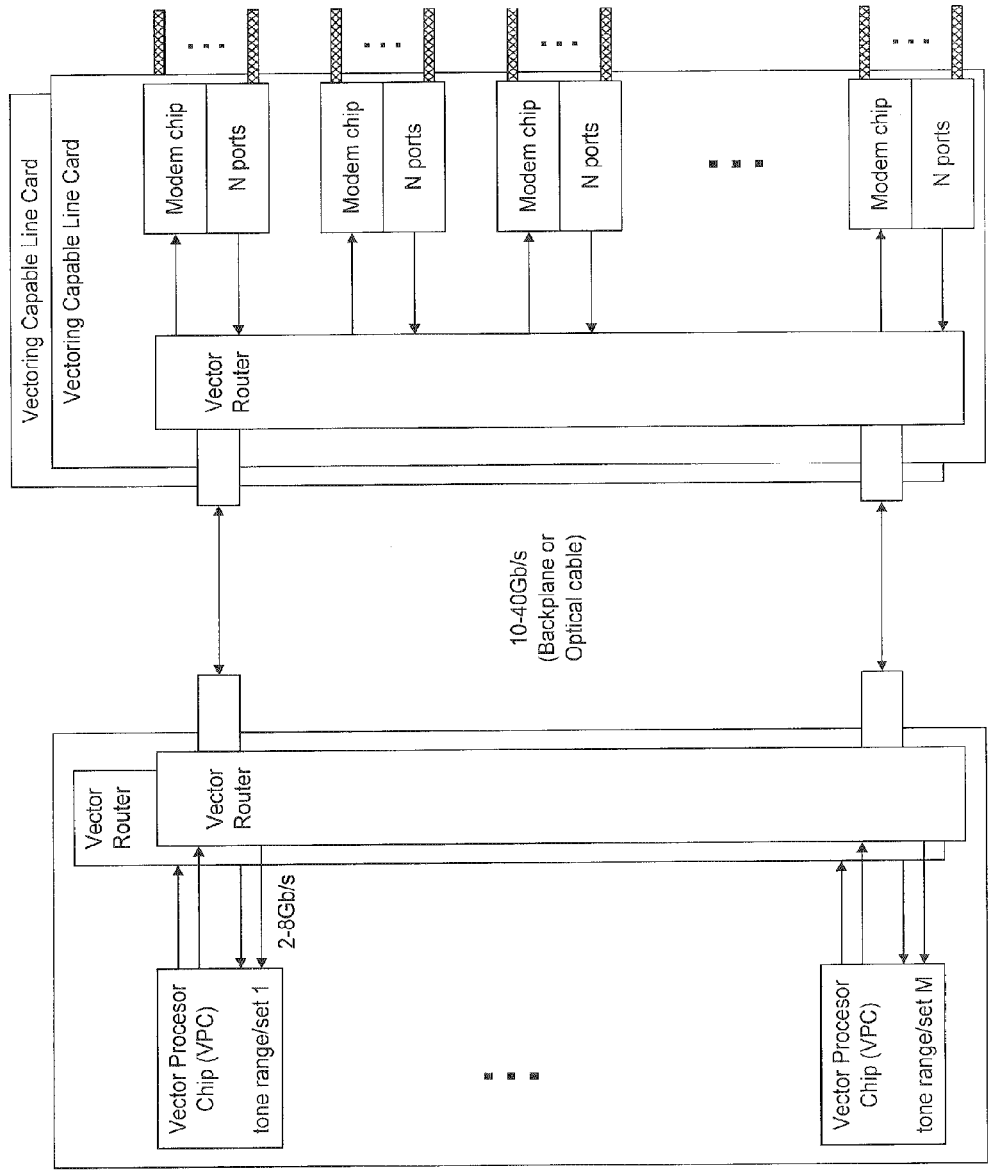

FIG. 10A illustrates one embodiment of a 48-port, single line card vectoring data communication system in which a single line card holds all modem ports, a vector router chip and any needed vector processing chips (in this example, 3 VPCs). The 48 ports are served in a relatively simple configuration and the system makes use of either copper backplane or optical cable communication to efficiently aggregate the FFT/IFFT data and interface between the line card and the vectoring card. FIG. 10B illustrates a multiple line card vectoring data communication system that serves 192 modem ports in an ITU 993.2 Profile 17a example. In the embodiment shown in FIG. 10C, no VRC-V is required, so the VPUs communicate directly with each line card's VRC-L. Similarly, FIG. 10D shows an embodiment in which no VRC-L is required, and each modem chip communications directly with a VRC-V. In this embodiment, modem chips on the "front" two line cards communicate with the "front" VRC-V, while modem chips on the "back" two line cards communicate with the "back" VRC-V. FIG. 10E shows yet another embodiment.

Exemplary system configurations are noted in Table 1:

| ITU 993.2 Profile | Modem ports/ chip | Modem chips/ line card | Modem ports/ line card | System line cards | System modem ports | System VRC-Vs | System VPCs |
|---|---|---|---|---|---|---|---|
| 8a | 12 | 4 | 48 | 4 | 192 | 2 | 6 |
| 12a | 12 | 4 | 48 | 4 | 192 | 2 | 8 |
| 17a | 12 | 4 | 48 | 4 | 192 | 4 | 8 |
| 30a | 8 | 3 | 24 | 4 | 96 | 4 | 6 |

The ITU 993.2 Profile 8a with 192 ports generates an estimated power dissipation of ~200 mW/port and 40 W for the total system (250 mW/port and 48 W for the 17a profile with 192 ports and 400 mW/port and 40 W for the 30a profile).

Figure 11:
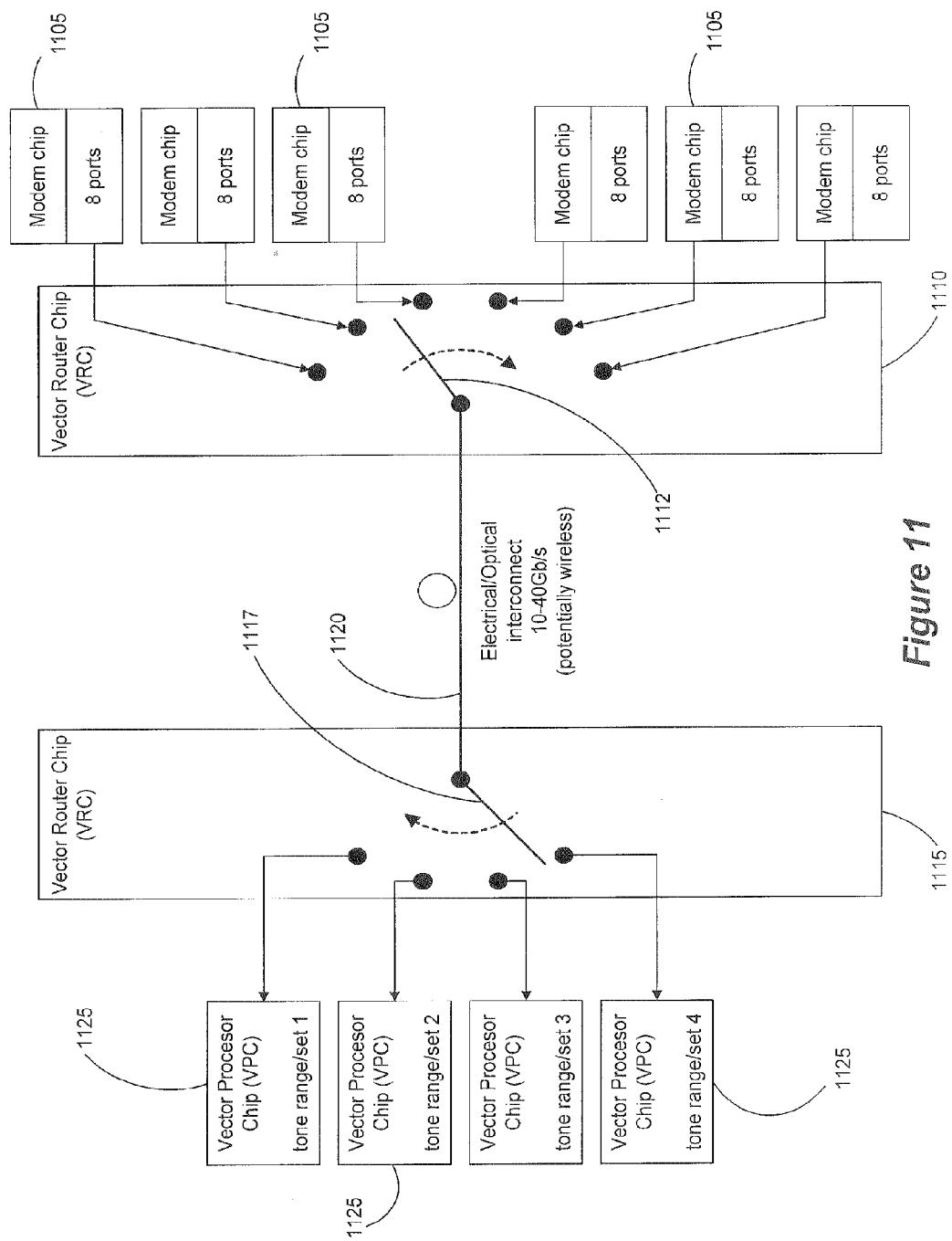
FIG. 11 is a block diagram showing an exemplary data transmission configuration for use in connection with one or more embodiments of the present invention.

FIG. 11 illustrates an embodiment of the present invention in which the vector router chips 1110, 1115 communicate data from six modems 1105 (the number of modems can vary as appropriate) to four VPCs 1125 (again, the number of VPCs can vary as appropriate) using a sweep-select 1112 to collect data from the modems 1105 and a sweep-distribution 1117 to distribute the collected data to the vector processor chips 1125. As can be seen in FIG. 11, the VRC-L 1110 is coupled to the VRC-V 1115 by a suitable interconnect 1120. The bus bandwidth used/needed/required can be determined in instance as follows:

$$\text{Bandwidth}=n\text{Ports}*(\text{Data\_Precision})*2*4\text{ kHz}$$

in which "2" indicates complex arithmetic. Finally, bandwidth bottlenecks can be avoided using the "striping" shown in FIG. 11.

Figure 12:
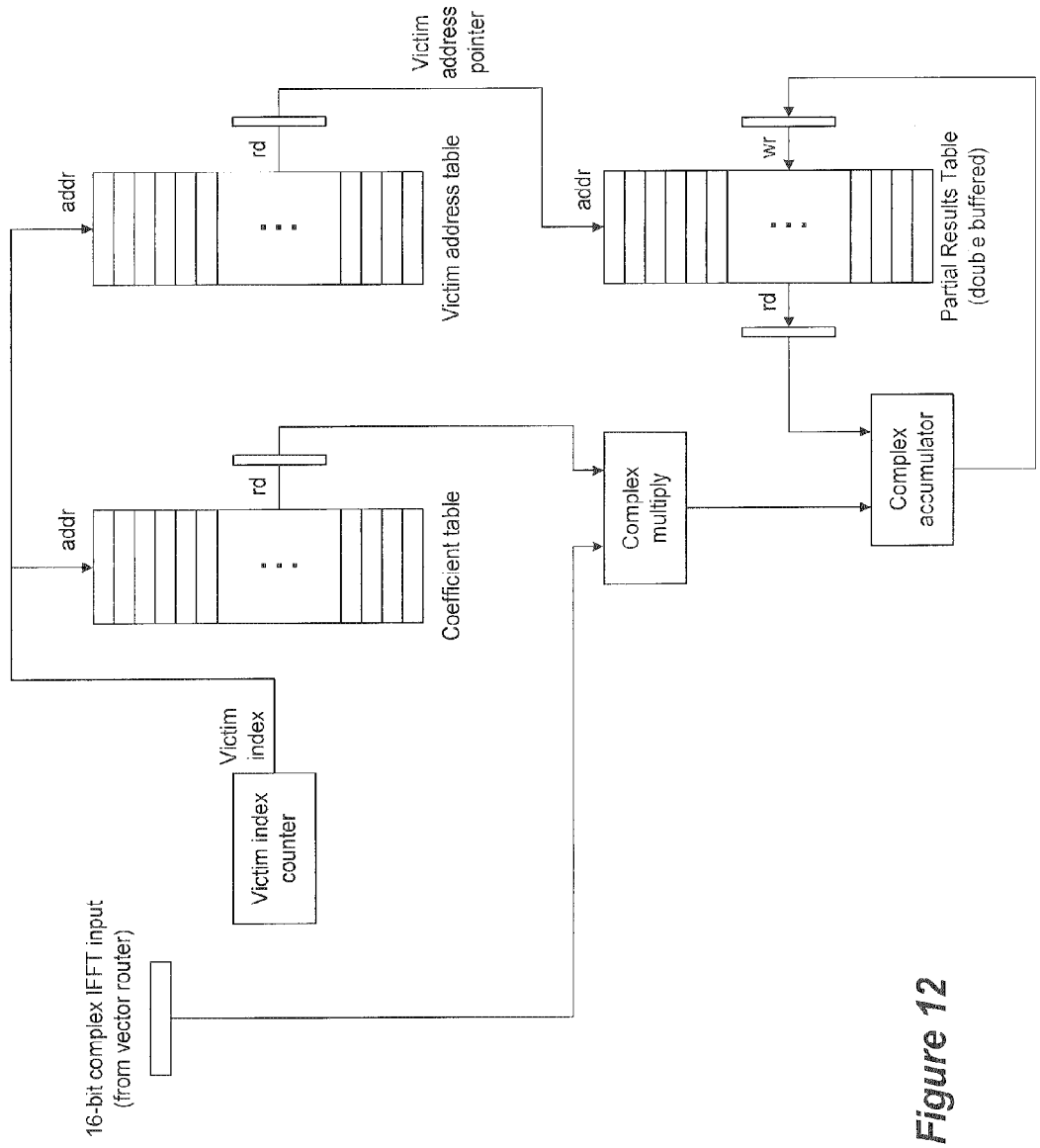
FIG. 12 is an exemplary logic implementation of a vector processor unit according to one or more embodiments of the present invention.

FIG. 12 illustrates one exemplary logic implementation of a vector processor unit. In this example, the sub-unit can process a single tone and FIG. 12 traces the data path for a vector processor core according to one or more embodiments of the present invention. This exemplary VPU is capable of processing one DMT tone at a time. As IFFT/FFT samples from each modem arrive from the vector router, the VPU determines the list of "victim" modems that must be FEXT canceled for this disturber. Using pre-determined FEXT cancellation coefficients from the coefficient table and the victim address list, the impact of this disturber can be accumulated into the partial results table for each victim modem (partial result of the FEXT cancellation operation). After the full set of disturber data has been received from the vector router for this tone and FEXT cancellation has been completed, the partial results table will then contain the resultant vectored IFFT/FFT samples for the current DMT tone, and this vectored data in then sent back to the vector router for transmission back to the modem ports.

Figure 13:
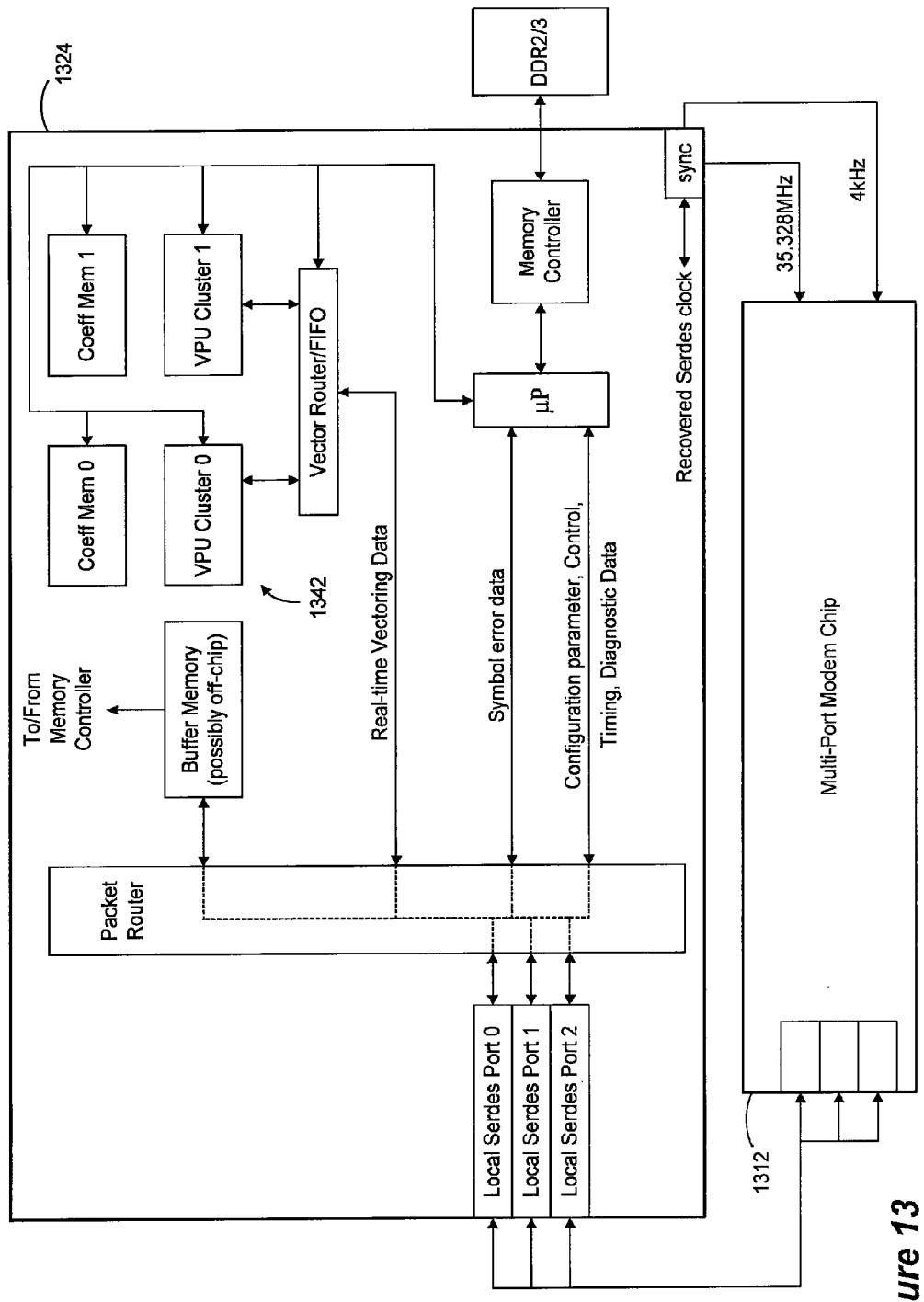
FIG. 13 is an exemplary vector processor implementing two VPUs and interfacing with at least one modem chip according to one or more embodiments of the present invention.

FIG. 13 shows an exemplary vector processor 1324 implementing two VPUs 1342 and interfacing with at least one modem chip 1312. Vector processor 1324 could be implemented in some embodiments of the present invention on a single FPGA, ASIC, etc. connected to modem chip 1312 or the like.

Figure 14:
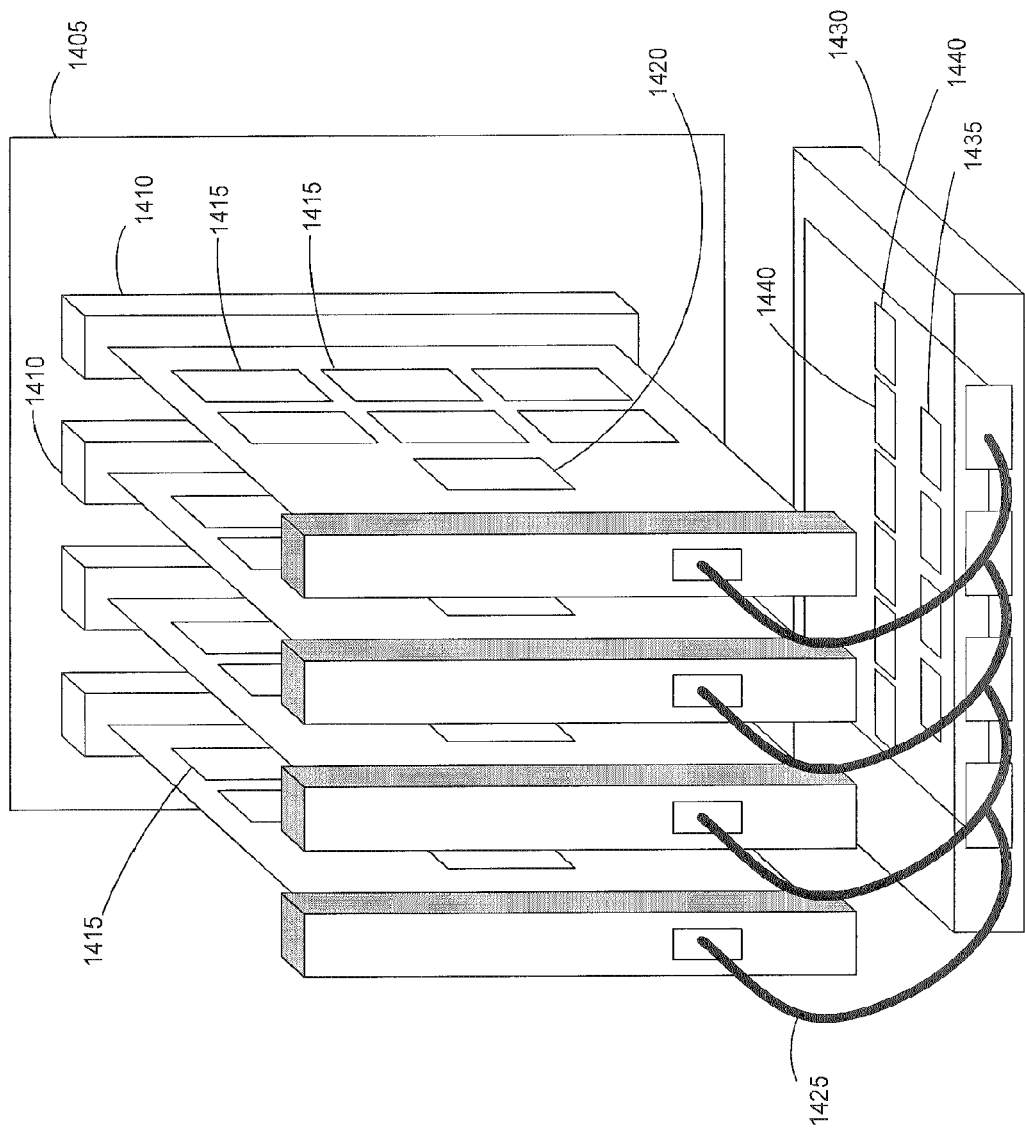
FIG. 14 is a DSLAM architecture embodiment showing a dedicated vectoring module with four line cards providing user data for vectoring.

The vectoring data communication system of FIG. 14 illustrates a DSLAM architecture embodiment showing a dedicated vectoring module 1430 with four line cards providing user data for vectoring. Line cards 1410 are mounted to a chassis or the like 1405 and each line card includes several modem chips 1415 and a vectoring interface device 1420. Each interface device 1420 communicates via optical interconnect 1425 with the vectoring module 1430, which can be a pizza box or a line card. Each module 1430 contains a line card interface chip 1435 that corresponds to one of the interface devices 1420 on line cards 1410. A number of processing chips 1440 are available for vector processing of user data.

Figure 15:
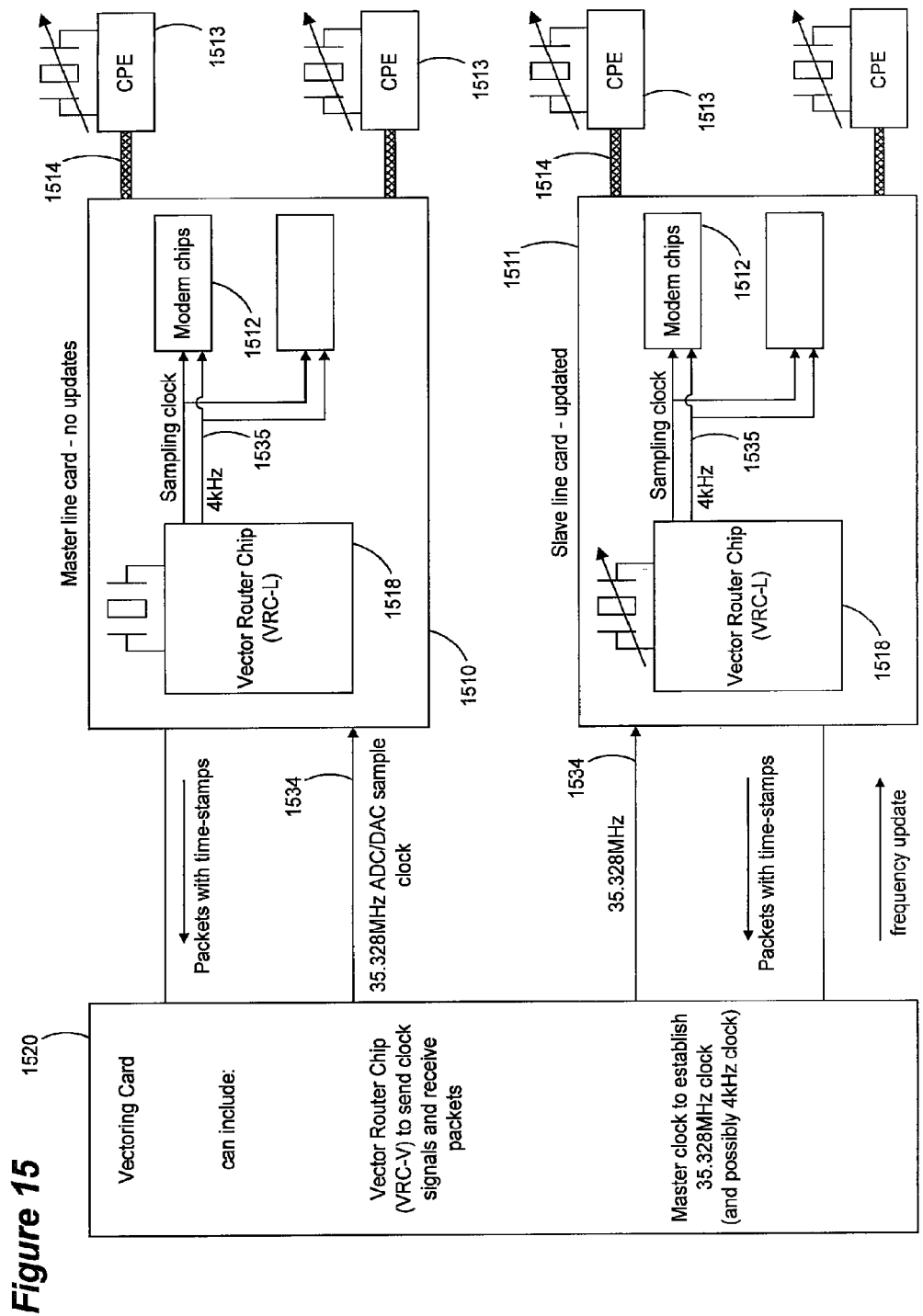
FIG. 15 illustrates clock synchronization of components in a vectored DSL system according to one or more embodiments of the present invention.

As illustrated in the system 1500 having a master line card 1510 and a slave line card 1511 in FIG. 15, in order for vectoring to work properly, all modems 1512 in the vector group must be synchronized to both an ADC/DAC sample clock 1534 and a DMT symbol clock 1535, shown as 35.328 MHz and 4 kHz, respectively. The DSLAM side modems 1512 are connected via DSL line 1514 to a number of customer-side DSL modems 1513. The high-speed sample clock is assumed to be distributed in some manner over a backplane or dedicated cable. The VRC-Ls 1518 can then phase lock to the high-speed sample clock and redistribute a low-noise sample clock to the modem chips 1517. In order to avoid sending a dedicated 4 kHz DMT symbol clock over the backplane or dedicated cable, it would be advantageous to use the high-speed communication interface intended to transmit vectoring data (XAUI or similar) to send timing information in data packets. The high-speed interface operates at a sufficiently high speed, that the approximate DMT symbol timing can be determined from such timing packets. As there is some tolerance to the exact DMT symbol timing (made possible, for example, by cyclic prefix and cyclic extension in the VDSL protocol), the VRC-L 1518 needs to determine only the approximate symbol timing provided that it will remain consistent thereafter (that is, synchronized to some fixed number of the high-speed sample clock periods).

Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

The invention claimed is:

1. A method for removing crosstalk interference in a vectored digital subscriber line (DSL) system, the method comprising:
    extracting unprocessed user data from a vectoring group comprising a plurality of DSL ports implemented by one or more upstream-end DSL modems, wherein the unprocessed user data comprises frequency domain data in one or more DSL ports;
    transmitting the extracted unprocessed user data over a vector data network to a vectoring control entity (VCE), wherein transmitting includes routing the extracted unprocessed user data between a vector router pair in the vector data network, the vector router pair comprising vector routers respectively associated with the vectoring group and the VCE;
    generating, by the VCE, processed user data by processing the unprocessed user data to perform crosstalk cancellation using far-end crosstalk (FEXT) cancellation data and the unprocessed user data for the vectoring group; and
    transmitting the processed user data via the vector data network from the VCE to the plurality of DSL ports from which the unprocessed user data was extracted,
    wherein the extracting and transmitting the unprocessed user data are performed with new unprocessed user data each discrete multitone (DMT) symbol period of the vectored DSL system.

2. The method of claim 1 wherein the vectored DSL system further comprises a bonded DSL port group comprising a first bonded DSL port and a second bonded DSL port, wherein each bonded DSL port is coupled to a VCE bonding agent via the vector data network, the method further comprising:
    transmitting bonding data from the first bonded DSL port to the VCE bonding agent via the vector data network; and
    transmitting bonding data from the VCE bonding agent to the second bonded DSL port via the vector data network.

3. The method of claim 2, wherein the first bonded DSL port resides on a first DSL port device and further wherein the second bonded DSL port resides on a second DSL port device, and wherein each DSL port device is at least one of the following: a chip, an ASIC, a modem, a line card, an IC and a microprocessor.

4. The method of claim 1, wherein the unprocessed user data comprises at least one of the following: inverse fast Fourier transform input (IFFT-input) transmit data for downstream vectoring, and fast Fourier transform output (FFT-output) received data for upstream vectoring.

5. The method of claim 1, wherein the VCE and at least one DSL port are implemented on the same line card.

6. The method of claim 5, wherein the VCE and the at least one DSL port are implemented on the same application-specific integrated circuit (ASIC).

7. The method of claim 1, wherein the VCE is implemented on one or more vectoring cards and further wherein the plurality of DSL ports are implemented on one or more line cards and further wherein each vectoring card and each line card are coupled to one another with the vector data network, wherein the vector data network comprises at least one of the following: one or more optical cables, a backplane and one or more XAUI lines.

8. The method of claim 1, wherein transmitting the extracted unprocessed user data over the vector data network to the VCE comprises packing the unprocessed user data into request packets prior to transmission to the VCE, and further wherein transmitting the processed user data via the vector data network from the VCE to the plurality of DSL ports from which the unprocessed user data was extracted comprises packing the processed user data into reply packets prior to transmission from the VCE.

9. The method of claim 8, wherein each request packet and each reply packet comprises a header, payload data, and one or more of the following: modem port identifying information, modem chip identifying information, line card identifying information, chassis identifying information, information about at least one DMT tone range to enable tracking and addressing of packets, a cyclic redundancy check (CRC), ports in packet information, superframe index information, symbol index information, tone group identifying information and port data.

10. The method of claim 1, wherein transmitting further includes generating, by a vector router associated with the vectoring group, a packet having a payload portion containing the extracted unprocessed user data and a packet header portion having information enabling the routing of the packet to the vector router associated with the VCE in the vector data network without direct links between the vector router associated with the vectoring group and a vector routed associated with the VCE.

11. The method of claim 1, wherein the VCE comprises one or more vector processor devices, the method further comprising allocating the transmitted unprocessed user data among the one or more vector processor devices in the VCE on the basis of DSL tone groupings.

12. A vectored digital subscriber line (DSL) system, the system comprising:
 a vectoring control entity (VCE); and
 a line card to:
  extract unprocessed user data from a vectoring group comprising a plurality of DSL ports implemented by one or more upstream-end DSL modems, wherein the unprocessed user data comprises frequency domain data in one or more DSL ports; and
  transmit the extracted unprocessed user data over a vector data network to the VCE; wherein the transmitting includes routing the extracted unprocessed user data between a vector router pair in the vector data network, the vector router pair comprising vector routers respectively associated with the vectoring group and the VCE;
 wherein the VCE is to:
  receive the extracted unprocessed user data over the vector data network;
  generate processed user data by processing the unprocessed user data to perform crosstalk cancellation using far-end crosstalk (FEXT) cancellation data and the unprocessed user data for the vectoring group; and
  transmit the processed user data via the vector data network from the VCE to the plurality of DSL ports from which the unprocessed user data was extracted;
 and wherein the extracting and transmitting the unprocessed are performed with new unprocessed user data each discrete multitone (DMT) symbol period of the vectored DSL system.

13. The system of claim 12, further comprising:
 a bonded DSL port group comprising a first bonded DSL port and a second bonded DSL port, wherein each bonded DSL port is coupled to a VCE bonding agent via the vector data network to:
 transmit bonding data from the first bonded DSL port to the VCE bonding agent via the vector data network; and
 transmit bonding data from the VCE bonding agent to the second bonded DSL port via the vector data network.

14. The system of claim 13, wherein the first bonded DSL port resides on a first DSL port device, the second bonded DSL port resides on a second DSL port device; and each DSL port device is at least one of the following: a chip, an ASIC, a modem, a line card, an IC and a microprocessor.

15. The system of claim 12, wherein the unprocessed user data comprises at least one of the following: inverse fast Fourier transform input (IFFT-input) transmit data for downstream vectoring, and fast Fourier transform output (FFT-output) received data for upstream vectoring.

16. The system of claim 12, wherein the VCE is implemented on the line card.

17. The system of claim 16, wherein the VCE and at least one of the DSL ports are implemented on a same application-specific integrated circuit (ASIC).

18. The system of claim 12, wherein:
 the VCE is implemented on one or more vectoring cards;
 the line card corresponds to a set of one or more line cards on which the plurality of DSL ports are implemented;
 each vectoring card of the one or more vectoring cards and each line card of the one or more line cards are coupled to one another with the vector data network; and
 the vector data network comprises one from the group consisting of: one or more optical cables, a backplane, and one or more XAUI lines.

19. The system of claim 12, wherein the line card is further to:
 pack the unprocessed user data into request packets prior to transmission to the VCE; and
 pack the processed user data into reply packets prior to transmission from the VCE.

20. The system of claim 19, wherein each request packet and each reply packet comprises a header, payload data, and one or more of the following: modem port identifying information, modem chip identifying information, line card identifying information, chassis identifying information, information about at least one DMT tone range to enable tracking and addressing of packets, a cyclic redundancy check (CRC), ports in packet information, superframe index information, symbol index information, tone group identifying information and port data.

* * * * *